(12) United States Patent
Ramadass et al.

(10) Patent No.: US 7,907,429 B2
(45) Date of Patent: Mar. 15, 2011

(54) CIRCUIT AND METHOD FOR A FULLY INTEGRATED SWITCHED-CAPACITOR STEP-DOWN POWER CONVERTER

(75) Inventors: Yogesh K. Ramadass, Cambridge, MA (US); Ayman A. Fayed, Wylie, TX (US); Baher Haroun, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 367 days.

(21) Appl. No.: 11/967,714

(22) Filed: Dec. 31, 2007

(65) Prior Publication Data

US 2009/0072800 A1    Mar. 19, 2009

Related U.S. Application Data

(60) Provisional application No. 60/972,076, filed on Sep. 13, 2007.

(51) Int. Cl.
   *H02M 3/18*    (2006.01)
(52) U.S. Cl. .................................. 363/59; 307/110
(58) Field of Classification Search .............. 363/59, 363/60; 307/109, 110, 536; 327/536
   See application file for complete search history.

(56) References Cited

U.S. PATENT DOCUMENTS

| | | | | |
|---|---|---|---|---|
| 6,055,168 A * | 4/2000 | Kotowski et al. | ................ | 363/60 |
| 6,657,876 B2 | 12/2003 | Satoh | | |
| 6,927,441 B2 * | 8/2005 | Pappalardo et al. | .......... | 257/299 |
| 6,995,995 B2 | 2/2006 | Zeng et al. | | |
| 7,545,658 B2 * | 6/2009 | Thiele et al. | .................... | 363/60 |

OTHER PUBLICATIONS

Ramadass, Y. K., et al., "Voltage Scalable Switched Capacitor DC-DC Converter for Ultra-Low-Power On-Chip Applications," IEEE Power Electronics Specialists Conference, pp. 2353-2359, Jun. 17-21, 2007, IEEE, Orlando, FL.
Cheong, S. V., et al., "Duty-Cycle Control Boosts DC-DC Converters," IEEE Circuits and Devices Magazine, vol. 9, Issue 2, pp. 36-37, Mar. 1993, IEEE, Los Alamitos, CA.

* cited by examiner

*Primary Examiner* — Gary L Laxton
(74) *Attorney, Agent, or Firm* — Ronald O. Neerings; Wade James Brady, III; Frederick J. Telecky, Jr.

(57) ABSTRACT

A circuit and method for providing a fully integrated DC-DC converter using on-chip switched capacitors is disclosed. A switched capacitor matrix is coupled as a digitally controlled transfer capacitor. A pair of non-overlapping, fixed frequency clock signals is provided to a switched capacitor circuit including the switched capacitor matrix and a load capacitor coupled to the output terminal. A DC input voltage supply is provided. A hysteretic feedback loop is used to control the voltage at the output as a stepped-down voltage from the input by digitally modulating the transfer capacitor using switches in the switch matrix to couple more, or fewer, transfer capacitors to the output terminal during a clock cycle. A coarse and a fine adjustment circuit are provided to improve the regulation during rapid changes in load power. A method of operating the regulator is disclosed.

21 Claims, 13 Drawing Sheets

Ratio: 2/3

CIRCUIT AND METHOD FOR A FULLY INTEGRATED SWITCHED-CAPACITOR STEP-DOWN POWER CONVERTER

This application claims the benefit of U.S. Provisional Application No. 60/972,076, filed on Sep. 13, 2007, entitled Switched Capacitor Step-Down Power Converter to Replace Linear Regulators in Embedded Power Management Applications, which application is hereby incorporated herein by reference.

TECHNICAL FIELD

The present invention relates to circuitry and methods for providing a regulated output voltage as a voltage supply for use in an integrated circuit. The circuits and methods are particularly useful as on-board voltages in integrated circuits including analog and digital circuitry and the like. A stepped-down output voltage is provided from an input voltage using a highly efficient power regulator circuit based on a switched capacitor arrangement and incorporating digital modulation circuitry to rapidly regulate the output. The methods and circuits provide efficient regulation even under minimal or no-load situations, such as power down or sleep modes of operation in battery-operated applications. The circuits are compatible with semiconductor processing and may be incorporated into a system integrated circuit (IC), for example, when the integrated circuit is used to implement a portable device.

BACKGROUND

Systems implemented on highly integrated semiconductor circuits are increasingly important, particularly in producing circuits used to implement battery-operated devices, such as cell phones, portable computers, such as laptops, notebooks and PDAs, wireless e-mail terminals, MP3 audio and video players, portable wireless web browsers, and the like. Sometimes these integrated circuits are referred to as "SOIC" (for "systems on an integrated circuit") or "SOC" (for "systems on a chip") devices. SOC devices increasingly include analog circuitry as a portion of an integrated function that also includes a large digital portion, for example, a microprocessor, DSP, RISC processor, or another large digital portion, often including on-board data storage. As is known in the art, SOCs have portions that operate as part of a system, for example, a portion of the integrated circuit may implement a so-called analog front end or AFE, the analog portion of a wireless receiver or a transmitter. Sensors such as anti-locking braking sensors, pressure sensors, temperature sensors, and other input sensors are often implemented using a large analog circuit and an analog to digital converter circuit that is then coupled to an on-board processing unit that is formed from digital logic circuitry. These highly integrated circuits require a variety of on-board supply voltages. Often these on-board supply voltages are created as "stepped down" voltages from a higher off board supply voltage, although "step up" circuits are also known. Many portable devices now being produced are powered by a battery supply, which creates a first supply voltage, and various on-board voltages are needed within the integrated circuit to power different functions. Typically these batteries are rechargeable so that even when recharging, the voltage that operates the circuit is taken from the DC battery supply.

In the prior art, a regulated supply voltage output is often provided using an LDO or "low drop out" voltage regulator circuit. As is well known in the art, the LDO relies upon the control of a power FET, operated in a continuous-time fashion, coupled between the input voltage and a lower output voltage. Feedback is used to compare a reference voltage taken across a resistor at the output to a regulated reference voltage. If the output voltage is rising above the desired output (e.g., the power demanded by the load, in the form of load current, is dropping), the bias voltage to the gate of the FET is raised (if it is a PMOS device) or lowered (if it is an NMOS device). Conversely, if the output voltage is dropping below the desired output, the bias voltage to the gate of the FET is lowered (if it is a PMOS devise) or raised (if it is an NMOS devise) to provide additional current to the load so that the output voltage rises to the desired level. Thus, the LDO is a linear circuit.

The efficiency of the LDO circuits of the prior art is higher with a higher output voltage (relative to the input voltage) but can be quite low with lowered output voltages. In applications where the output voltage of the LDO is low, for example, less than 1V with a 1.8V input supply, the efficiency may be quite low, which means an increase in wasted power. This inefficiency leads to shorter battery life, or shorter battery operating time between charges for rechargeable devices, for example. Present circuits may often operate at even lower operating voltages and this inefficiency becomes more problematic as operating voltages for integrated circuits decrease.

Another prior art DC-to-DC converter solution is to use an off-chip switching regulator with off-chip components, or an on-chip controller with off-chip components. Switching regulators are known to be able to achieve increased efficiencies at lower output voltages than LDO circuits. As integration increases and the size of the devices is reduced, the use of off-chip regulators, and/or of off-chip components, becomes undesirable for several reasons. Further, the use of switching regulators with typical switching frequencies in wireless or cellular device applications can create tone frequencies and noise problems that are unacceptable.

FIG. 1 depicts an example of a simplified circuit diagram of a prior art synchronous switching regulator circuit or buck converter. The circuit uses a series inductor and a capacitor to provide an output voltage Vout at a terminal with the output taken across the capacitor. The buck converter replaces the power device used in classical LDOs with a series combination of a power switch and an inductor. By switching the power switch on and off at a given frequency with a given duty cycle, the inductor maintains an average current equal to the current needed by the load. Further, with the aid of a feedback control circuit, output voltage Vout can be maintained at a regulated level while providing the load with the needed current by manipulating the duty cycle of the switching or the switching frequency itself. However, the switching of the power device results in a regulated average output voltage with voltage ripples around the regulated level.

The implementation of a fully integrated on-chip switching regulator, such as that of FIG. 1, requires using on-chip components including a capacitor and an inductor, as well as the switching circuitry. In an exemplary circuit, at a typical semiconductor technology process node of 65 nanometers, a capacitor of 400 pF and an inductor of 80 nH was calculated, with the switching circuitry, to require a silicon area of roughly about 0.85 $mm^2$. Of this area, the on-chip inductor requires approximately 0.8 mm. In simulation, with a fixed switching frequency and a Pulse Width Modulation (PWM) control scheme, the circuit can be shown to have substantially increased efficiency in producing output voltages ranging from 0.6V to 1V from a 1.8V input supply voltage, when compared to a typical LDO regulator providing the same output voltages. At 1V, a preliminary study shows the switching regulator to have an efficiency of roughly 70% with an output load current of 10 milliamps and a supply voltage of 1.8V. At an output voltage of 0.7V, with an output load current of 7 milliamps, the efficiency drops to around 60%, but the circuit is still substantially more efficient than an LDO at the same output load current and output voltage.

Silicon area is the biggest problem in implementing the fully integrated synchronous buck converter of FIG. 1 with on-chip capacitors and inductor, and most of the area is due to the 80 nH on-chip inductor. The same design but using a 10 nH inductor instead of an 80 nH inductor has been evaluated. In this case, the area for the inductor is reduced to 0.09 mm² in the same exemplary 65 nanometer semiconductor process technology. This circuit, however, has two significant problems that make it impractical for use as a regulator. First, the reduction in the inductor value results in a larger current ripple in the inductor, and thus a larger output voltage ripple. Second, a significant efficiency loss is observed due to operating the inductor in discontinuous conduction mode, which is a direct unavoidable result of reducing the inductor value while at the same time maintaining the fixed switching frequency and the PWM control scheme. Using the smaller inductor resulted in an efficiency drop from about 70% with the 80 nH inductor to about 25.5% with the 10 nH inductor, which is even worse than a linear regulator (LDO) in the same output voltage and load current conditions.

A study was also made using the synchronous rectifier or buck converter described above with the smaller on-chip 10 nH inductor in discontinuous conduction mode but using a Pulse Frequency Modulation (PFM) control scheme instead of the PWM control scheme. Using this technique improved the efficiency, and the ripple obtained was similar to an LDO. The efficiency of such an approach at a 1V output voltage with a 10 milliamp load current was 61%. The efficiency at a 0.7V output voltage with a 7 milliamp load current was 60%. However the use of a PFM control scheme is not practical for many applications because the varying frequency of the switching circuitry produces an unpredictable ripple voltage spectrum at the output that is a function of the load current, and thus cannot be easily filtered. In wireless applications in particular, or in other noise-sensitive applications, using a PFM control scheme is highly undesirable due to its unpredictability.

DC-DC converters arranged without inductors are also known in the prior art. A switched capacitor circuit may be used to provide a stepped-up, stepped-down, or unity gain configuration DC-DC converter. In a switched capacitor circuit, a "flying" or charge transfer capacitor is alternatively switched between being coupled to an input voltage (typically a battery or other DC voltage) and to the load, while a holding or load capacitor is used to maintain the output voltage at the load. The discharge of the two capacitors at the output voltage terminal will provide output load current. The load or holding capacitor is discharged along with the flying capacitor during the "gain" portion of the cycle, and the charge transfer or flying capacitor is charged by the input supply during the "common" portion of the cycle. Switches are used to reconfigure the circuit in a clocked arrangement. Typically, two non-overlapping clocks are applied to the circuit to drive the switches.

FIG. 4 depicts a simple circuit diagram of a typical switched capacitor circuit. The particular function of the circuit in FIG. 4 is to step-down a voltage $V_{BAT}$, a DC supply voltage, to an output voltage Vout. By using ratios for the capacitors C1 (having a value $2C_B$) and $C_L$, the output voltage Vout may be modified. As is known to those skilled in the art, the gain may be determined by different arrangements of the capacitors C1 and $C_L$, for example, the circuit in FIG. 4 will give a stepped-down output voltage of Vin/2. A paper, authored by one of the inventors of the present application, entitled "Voltage Scalable Switched Capacitor DC-DC Converter for Ultra-Low Power On-Chip Applications" by Yogesh K. Ramadass and Anantha P. Chandrakasan, published in Proceedings of the IEEE Power Electronics Specialists Conference, pp. 2353-2359, February 2007, (hereinafter "Ramadass"), which is herein incorporated by reference, describes a variety of capacitor topologies to provide output voltages from a single supply while using a PFM scheme to regulate the output voltage.

The switched capacitor circuit is operated by clocking the switches labeled SW1A, SW1B, SW2A and SW2B with non-overlapping continuous waveforms or clocks $\Phi_1$ and $\Phi_2$. In this manner, the capacitor C1, the charge transfer or "flying" capacitor, is alternatively charged by the battery or discharged into the load, and the current is transferred to the load by the transfer capacitor $C_L$. Simple digital circuitry is used to build the non-overlapping clocks $\Phi_1$ and $\Phi_2$ from a clock signal, and typical frequencies may vary from 10 kHz to 100 MHz.

FIGS. 5a and 5b depict representative simplified circuitry illustrating the two phases of operation of the switched capacitor circuit of FIG. 4. In FIG. 5a, the phase 1 clock $\Phi_1$ is active. This places the 1/2 gain switched capacitor circuit of FIG. 4 in "common" mode, wherein the battery is coupled to the circuit and provides current to charge the flying capacitor. During this phase, switches SW1A and SW1B in FIG. 4 are closed while switches SW2A and SW2B in FIG. 4 are open. Then, as illustrated in FIG. 5b, in the second phase of operation, the phase 2 clock $\Phi_2$ is high or active, switches SW2A and SW2B in FIG. 4 are closed, and switches SW1A and SW1B in FIG. 4 are open. In this configuration, the flying capacitor C1 of FIG. 4 is coupled to the load in parallel with the load capacitor $C_L$ and the load current discharges the capacitors. This phase is sometimes called the "gain" operation. As the current is discharged from the capacitors C1 and $C_L$ by the load coupled to the Vout terminal (see FIG. 4), the circuit will have to again receive energy from the DC supply voltage $V_{BAT}$. By constantly cycling the clocks $\Phi_1$ and $\Phi_2$, the switched capacitor circuit of FIG. 4 will provide a DC output voltage (the "no load" voltage) of voltage level $V_{BAT}/2$.

As is also well known in the art, and as further described by Ramadass, the use of different capacitor topologies in the switched capacitor circuit can provide a wide range of gain ratios, including stepped-up and stepped-down ratios. FIG. 6 depicts a simplified illustration of a switched capacitor circuit that provides a gain of 2/3. In FIG. 6 two capacitors C2 and C3 are provided in the transfer capacitor stage with corresponding switches.

During the phase of operation when clock $\Phi_1$ is high, switches SW1A, SW1B, SW1C and SW1D are closed. An examination of the circuit of FIG. 6 then reveals that in this "common" phase, capacitors C2 and C3 having values $C_B$ are both coupled between the input $V_{BAT}$ and the output terminal Vout, and so are receiving charge from the battery or other DC voltage source.

During the second phase of operation, when the clock $\Phi_1$ is low, the clock $\Phi_2$ is high (again, non-overlapping with $\Phi_1$. Switches SW2A, SW2B and SW2C are closed. Examination of the circuit then reveals that capacitors C2 and C3 are now connected in series between the ground terminal and the output voltage Vout, and the series combination is in parallel with capacitor $C_L$, which is discharging to the load. Thus, the output voltage Vout is now 2/3 of $V_{BAT}$, instead of 1/2, as in the circuit of FIG. 4.

To provide a practical regulated supply voltage, the output voltage Vout must be regulated. Feedback or hysteretic control circuitry is typically used to provide the control loop for the DC-DC converter function. Because the output voltage Vout depends on how many cycles there are (pulse frequency) and the length of time the clocks $\Phi_1$ and $\Phi_2$ are active (pulse width), modulation schemes are known in the prior art using voltage monitoring circuitry (typically a sense resistor at the output provides a proportional monitoring voltage) and op amp comparators or other comparator circuitry to detect when more, or less, current is needed to maintain the output voltage Vout at a desired DC level. When the comparator circuitry determines more current is needed by the load (output voltage Vout is falling), the control circuitry will either increase the switching frequency (in PFM mode) or increase the amount of time the charge transfer capacitor C1 is charged by the $V_{BAT}$ by modulating the pulse width of the clocks $\Phi_1$ and $\Phi_2$ (PWM) until the output voltage Vout increases. When the load is demanding less current, the output voltage Vout will rise, and the control circuitry will provide correspondingly less energy from the $V_{BAT}$ by reducing the switching frequency (in PFM mode) or by reducing the pulse width (in PWM mode) in order to maintain the output voltage Vout within a desired range.

DC-DC switched capacitor circuits using PFM or PWM control schemes are practical solutions for many applications. The efficiency of these circuits can be improved using various known schemes including "pulse skipping" for no load or light load conditions or "stand by" or "sleep" modes of operation for remaining conditions. Some known approaches also use gain hopping. Since the efficiency of the switched capacitor circuit increases when the "no load" voltage is very close to the desired output voltage Vout, changing the gain can improve efficiency. For example, duty cycle control is described in a paper entitled "Duty-Cycle Control Boosts DC-DC Converters," by Cheong et al., IEEE Circuits and Devices Magazine, vol. 9, pp. 36-37, March 1993. However, the use of PFM control schemes creates tones or spurs in the output voltage Vout that are not predictable, making effective filtering of these tones impracticable. Thus, the use of this kind of control to achieve voltage regulation in a switched capacitor DC-DC converter is not preferable for many applications where the unpredictable tone frequency is not acceptable, for example, in certain analog, wireless, cellular or other transmitting and receiving technologies where the tone noise would make operation of the circuitry coupled to the output voltage Vout in the load impossible.

Another approach to regulate output voltage Vout of switched capacitor DC-DC converters uses fixed frequency approaches. U.S. Pat. No. 6,995,995, issued Feb. 7, 2006 to Zeng, et al., describes the use of segmented switches to regulate the output voltage Vout provided during the charging or gain phase of the clock cycle. In this segmented switch mode, the size of the switches (the current path) is modulated while the switching frequency is left constant. While these approaches will not have the same tone or noise unpredictability problems of the PFM control scheme, other problems arise. By using PWM control schemes or segmented switch modes (changing the current supplied to the capacitors by changing switch sizes to regulate the output voltage), these approaches rely on a fixed switching frequency regulation scheme. However, the loss mechanisms associated with switched capacitor circuits do not scale with the load power in these schemes. Also, effective output regulation in response to wide variations in load power cannot be obtained using switched capacitor DC converters regulated with these approaches.

A need thus exists for an area-efficient and cost-effective solution to the problem of providing a regulated DC output voltage from a DC input supply voltage with high efficiency even at low regulated voltages or no load conditions. The circuit must be practical to integrate on the same integrated circuit with other digital and analog circuitry, be silicon area efficient, and must provide small voltage ripple. The use of a fixed frequency of operation is needed to produce tone spurs or noise only at predictable, filterable frequencies in the output so as to be compatible with analog, cellular and wireless applications, while maintaining the output voltage within a narrow regulation variance over a wide range of load power demand conditions.

SUMMARY OF THE INVENTION

These and other problems are generally solved or circumvented, and technical advantages are generally achieved, by embodiments of the present invention, which provide circuits and methods of forming a digitally controlled switched capacitor circuit for outputting a regulated, stepped-down supply voltage to power a load circuit.

In one preferred embodiment, a switched capacitor DC-to-DC converter circuit is used to provide regulated output voltage to a load. A load capacitor is coupled to the output terminal. A segmented, switched capacitor matrix is used to provide a digital capacitance modulation circuit for the transfer capacitor. A pair of fixed frequency, non-overlapping clocking signals is provided to drive the switches in the switched capacitor circuitry. A hysteretic control loop is established using a voltage feedback path from the output. Control circuitry increases, or decreases, the output voltage by increasing, or decreasing, the transfer or flying capacitor in response to comparators that monitor the output voltage. This control loop uses a digital counter to add and subtract a value that in turn generates proportionally weighted control lines used to modulate the transfer capacitance.

In another preferred embodiment, a fine bank of segmented switched capacitors and a coarse bank of segmented switched capacitors are provided. In one preferred embodiment, the coarse bank implements a binary weighed scale of unit capacitance values. The fine bank implements a plurality of fractional values of the unit capacitance values. Control signals are generated to decrement, or increment, the weight of the transfer capacitance during operation of the regulator. If the output voltage is a great deal from the desired value, a coarse mode of adjustment is used to rapidly increment, or decrement, the transfer capacitance, thereby regulating the output rapidly. If the output voltage is near the desired voltage, a fine adjustment is made to slowly increment, or decrement, the transfer capacitance, thereby making efficient regulation of the output voltage.

In another preferred embodiment, a low load or no load mode of operation is provided. Circuitry to replace the fixed frequency clock pulses with a lower variable frequency signal is used to enable the switching capacitor converter to efficiently regulate the output voltage when the load is not consuming power or is consuming very little power, such as for sleep or stand by modes of operation of battery-powered devices.

In one preferred embodiment, the capacitors are implemented using N-poly N-well capacitors. In another preferred embodiment, the capacitors are implemented using metal-dielectric-metal capacitors above the substrate.

Additional preferred embodiments provide control circuitry to couple unused capacitors in the segmented capacitor switch matrix to the load capacitor to further increase the value of the load capacitor and to reduce voltage ripples at the output terminal, thereby increasing circuit performance.

A preferred method of the present invention provides a load capacitor coupled between an output voltage and a ground reference potential. A switched capacitor circuit including a transfer capacitor coupled to the load capacitor and selectively coupled to a voltage supply and selectively coupled to the ground reference potential is provided to clock the switch capacitor at a fixed frequency to alternatively charge the transfer capacitor by coupling it between the battery supply and the output terminal and then to discharge the transfer capacitor by coupling it between the output terminal and the ground reference potential. The method also monitors the output voltage and determines when it is above a first threshold and determines when it is below a second threshold, and digitally modulates the value of the transfer capacitor responsive to the monitoring of the output voltage to maintain the output voltage between the second threshold and the first threshold.

In additional preferred methods, providing the transfer capacitor further comprises providing a switch matrix of segmented capacitance circuits that are selectively enabled responsive to control lines, and providing control circuitry for increasing the transfer capacitance to increase the output voltage and for decreasing the transfer capacitance to decrease the output voltage by enabling and disabling segments of the segmented capacitance circuits in the switch matrix, responsive to the monitoring circuitry. In additional preferred methods, providing the control circuitry further provides a coarse mode of adjustment and a fine mode of adjustment, wherein, in the coarse mode of adjustment, the transfer capacitor is adjusted in increments or decrements of a unit capacitor value each cycle and, in the fine mode of adjustment, the transfer capacitance is adjusted in increments or decrements of fractions of the unit capacitor value.

In additional preferred methods of the invention, providing segmented capacitor values for the transfer capacitor further provides a plurality of weighted switched capacitor circuitry that implements a binary scale. In further preferred methods, providing the segmented capacitor values further provides switched capacitor circuitry that is weighted in fractions of a unit capacitor value.

In further preferred methods, providing segmented capacitance circuits further provides switched capacitor circuitry that selectively provides a first gain and a second gain. In another preferred method, the first gain is a first ratio and the second gain is a second different ratio, and control circuitry is provided to perform as a stepped-down DC-DC converter by outputting an output voltage that is less than the input supply voltage.

Additional preferred methods provide digital capacitance modulation circuitry by providing digital control logic to control the switches and to clock the transfer capacitance circuitry. In another preferred method, a low power mode of operation is provided using pulse frequency modulation to lower the switching frequency when the control circuitry and the output voltage monitoring indicate there is no power demanded at the output. In another preferred method, the low power mode of operation is entered when the control circuitry indicates the segmented transfer capacitance should go below its lowest setting. In another preferred method of operation, the low power mode of operation is needed when the control circuitry indicates that the transfer capacitance should be increased above its lowest setting over several cycles when the low power mode is enabled.

In an additional preferred method, a coarse mode of adjustment is entered at power up. In an additional preferred method, a coarse mode of operation is entered into when the output voltage falls below a predetermined threshold voltage set by a user. In another preferred method, the coarse mode of operation is ended and a fine mode of operation begins when the control circuitry detects an output voltage above the first threshold on one clock cycle and below the second threshold on a subsequent clock cycle. In the fine mode of operation, adjustments to the transfer capacitance are made in fractions of a unit capacitance.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiments disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5a and 5b, illustrates operations of the circuit of FIG. 4, wherein FIG. 5a illustrates a common mode of operation, and FIG. 5b illustrates a gain mode of operation;

FIGS. 12a and 12b depict efficiency graphs for preferred embodiments of converter circuits incorporating the features of the invention, wherein FIG. 12a depicts the efficiency of a first preferred embodiment converter circuit formed with N-poly-N-well capacitors, and FIG. 12b illustrates the efficiency of a second preferred embodiment converter circuit formed with metal dielectric metal capacitors.

DETAILED DESCRIPTION OF ILLUSTRATIVE EMBODIMENTS

Figure 1:
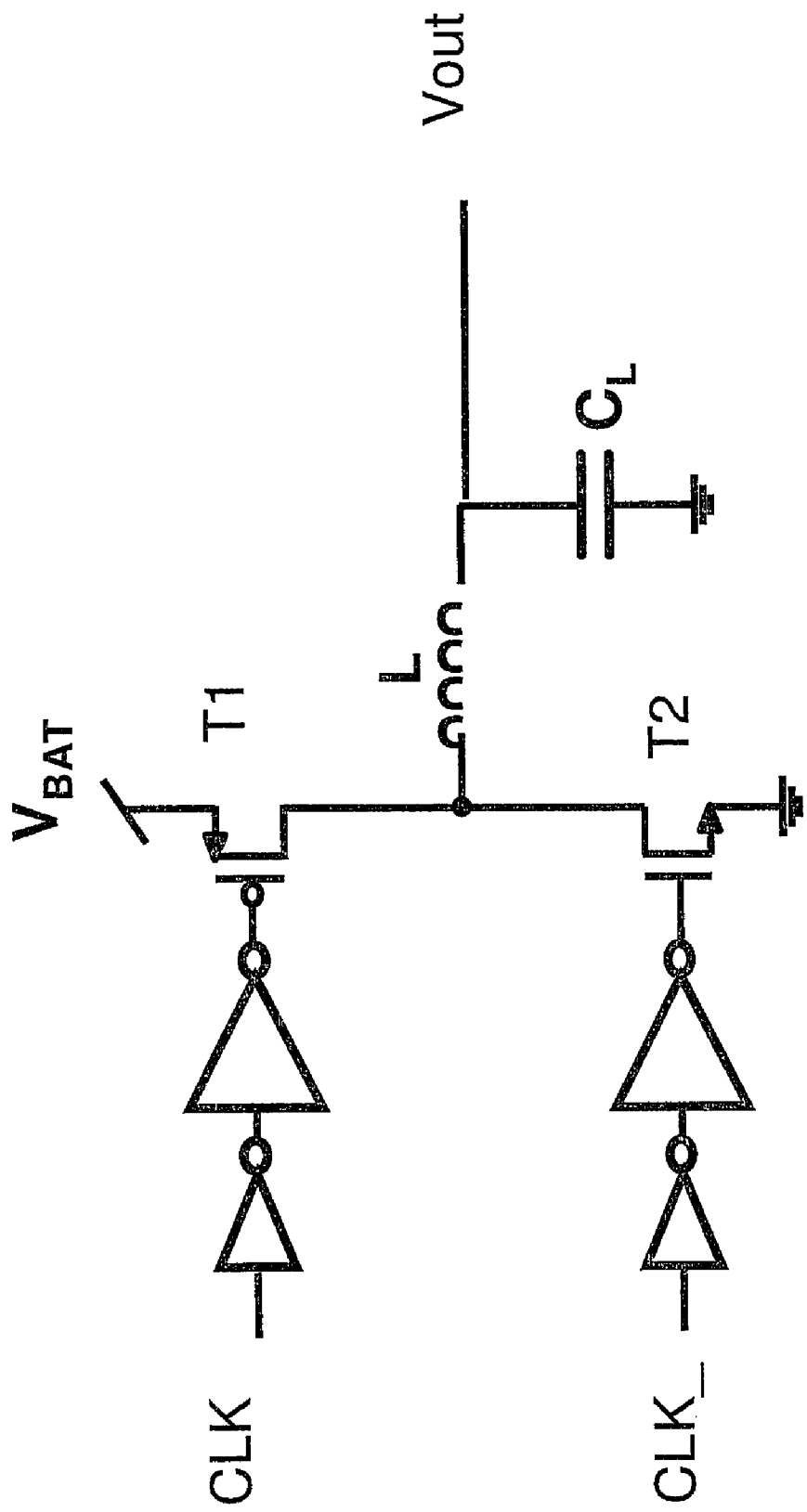
FIG. 1 illustrates a synchronous buck converter regulator circuit of the prior art.
Figure 2:
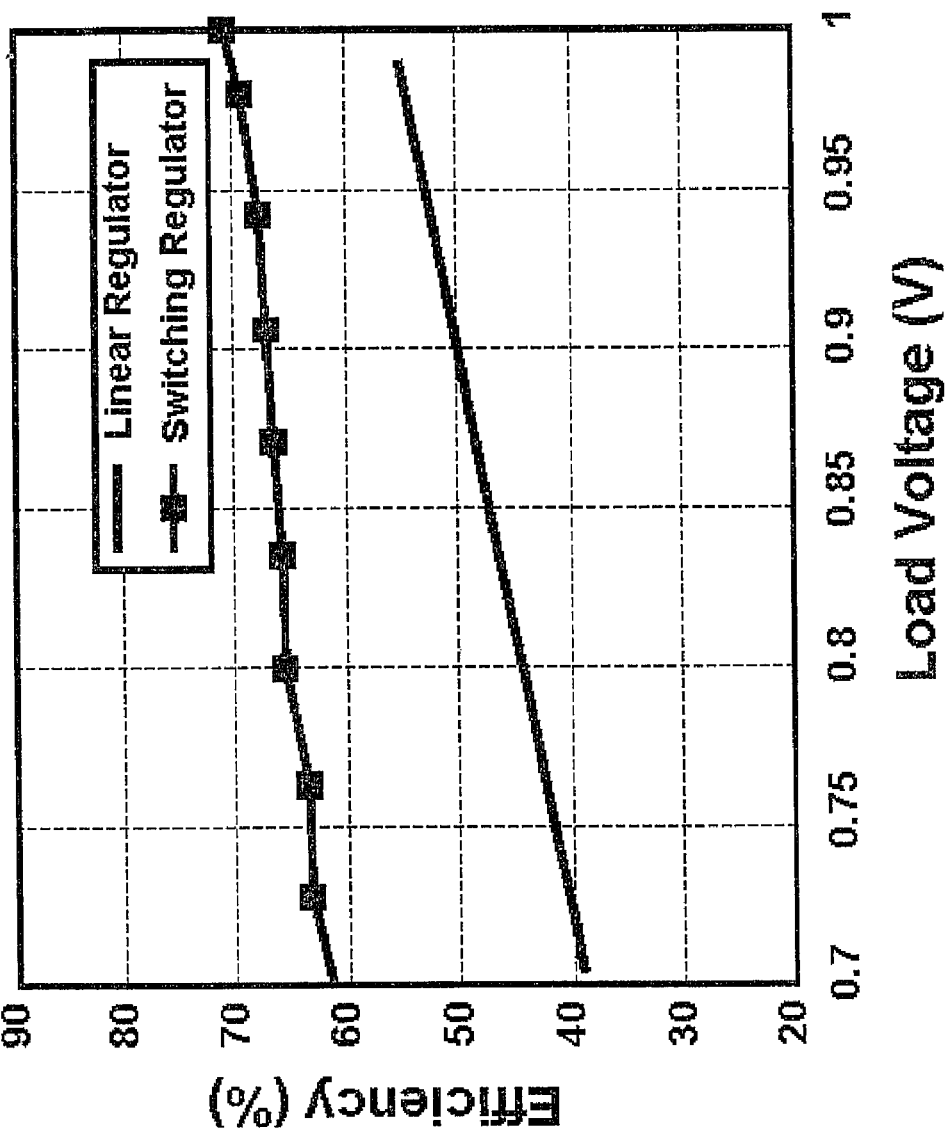
FIG. 2 illustrates an efficiency graph of the circuit in FIG. 1.
Figure 3:
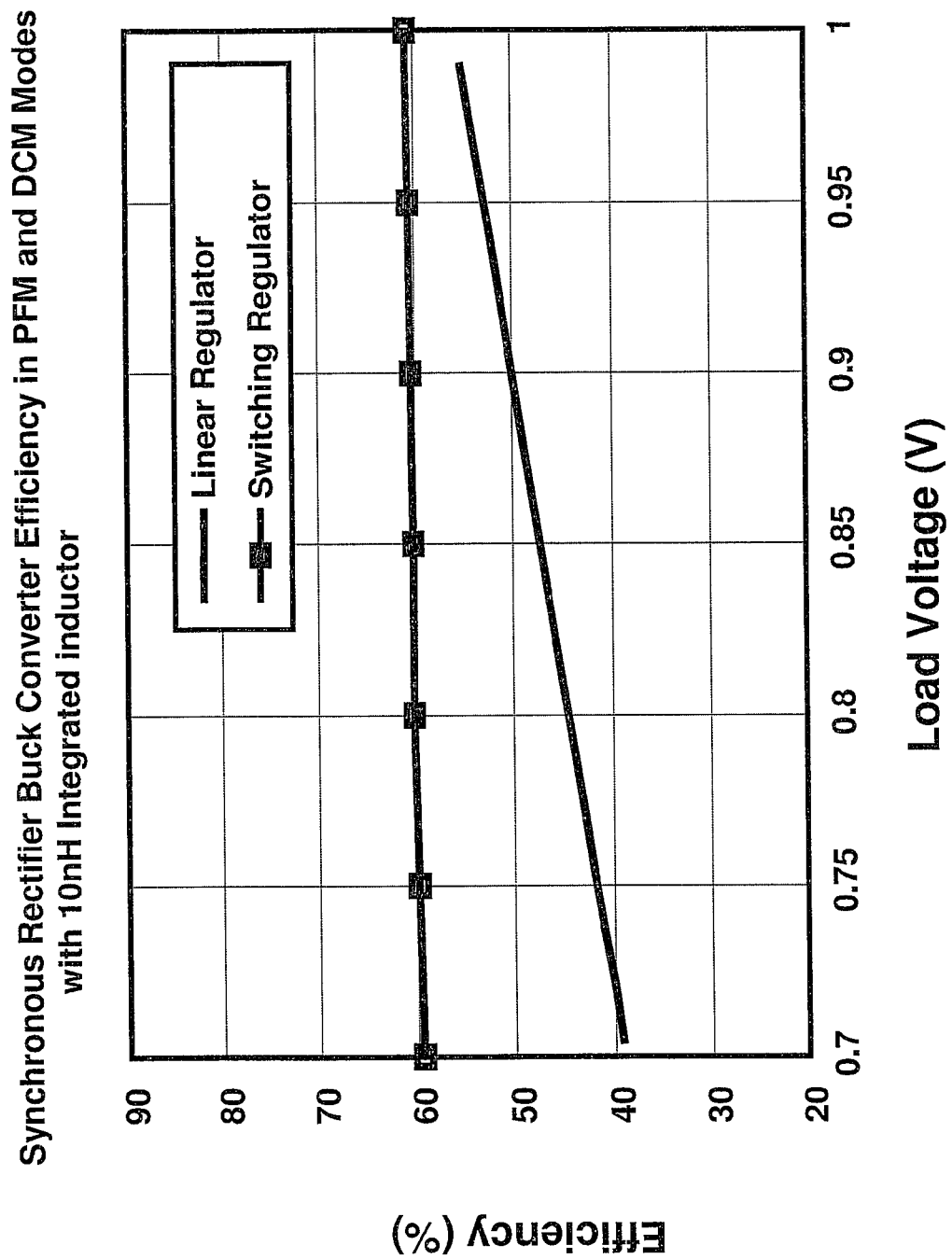
FIG. 3 illustrates an efficiency graph of a circuit such as the buck converter in FIG. 1 in a discontinuous mode of operation.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Preferred embodiments of the invention provide a DC-DC converter for outputting a highly regulated DC output voltage that is user selectable, using an area-efficient and semiconductor process compatible integrated switched capacitor circuit and associated control circuitry. The circuit is easily integrated into existing commercial semiconductor processes, uses only on-chip components, and is free from the frequency spectrum problems and loss problems of prior art switched capacitor circuitry. Preferred embodiments of the invention provide additional increases in efficiency by using a variable DC gain architecture, and by switching from a fixed frequency mode to a PFM or pulsed frequency modulation scheme under "stand by" or sleep conditions where the load is consuming little or no power.

In preferred embodiments, digital control circuitry provides automatic detection and regulation of the output voltage, automatic switching to the PFM mode, and in other preferred embodiments, automatic switching between a coarse and a fine adjustment mode to provide rapid response to rapid changes in output power loading and better regulation in a narrow regulation window when the load power is constant. Additional preferred embodiments provide a method for further reducing the ripple current obtained from the circuit by switching unused capacitors from the transfer capacitance to the load to still further improve performance without any increase in silicon circuit area.

The benchmark or target performance criterion considered for the preferred embodiments of the invention and methods include providing an integrated DC-DC step-down circuit and a method for converting a supply voltage to a lower output voltage with excellent regulation. The circuit and methods are shown to be more power efficient than an LDO solution as is known in the prior art, to be silicon area efficient, and to have similar performance to an LDO circuit, e.g., characteristics such as power supply rejection ratio, ripple, and other performance characteristics should be similar to the performance of the LDO. A fixed frequency mode of regulation of the switched capacitor converter is used in the preferred embodiments to eliminate the tone or spur problems of PFM and PWM approaches of the prior art converters.

In order to maximize the efficiency of a converter using switched capacitors, the gain should be adjusted so that the output load voltage is close to the "no-load" voltage. The efficiency that can be obtained from a switched capacitor converter is limited to a ratio of the load voltage to the no-load voltage of the gain setting being used.

The efficiency can be shown to be limited to:

$$\eta_{lim} = (1 - \Delta V/V_{NL}). \tag{1}$$

Thus, to improve efficiency, the voltage $\Delta V$ (the difference between no-load voltage $V_{NL}$ and the load voltage) should be minimized. In preferred embodiments of the present invention, in addition to other control circuitry, the gain of the converter circuit is selected from at least two settings, for example a 1/2 and a 2/3 VO/$V_{BAT}$ supply gain setting, to place the no-load output voltage $V_{NL}$ as close to the output voltage desired at the load $V_L$ as possible. Once the gain is set for a particular application, preferably by automatic selection based on the output voltage desired by the user, it is typically not changed (unless the output voltage setting selected is also changed). Each of the switched capacitor circuits described below in discussing the preferred embodiments has this selectable two gain feature.

The overall design approach of the preferred embodiments may be better understood with an understanding of the power delivery equations that describe the load power delivered by a switched capacitor converter circuit.

Figure 4:
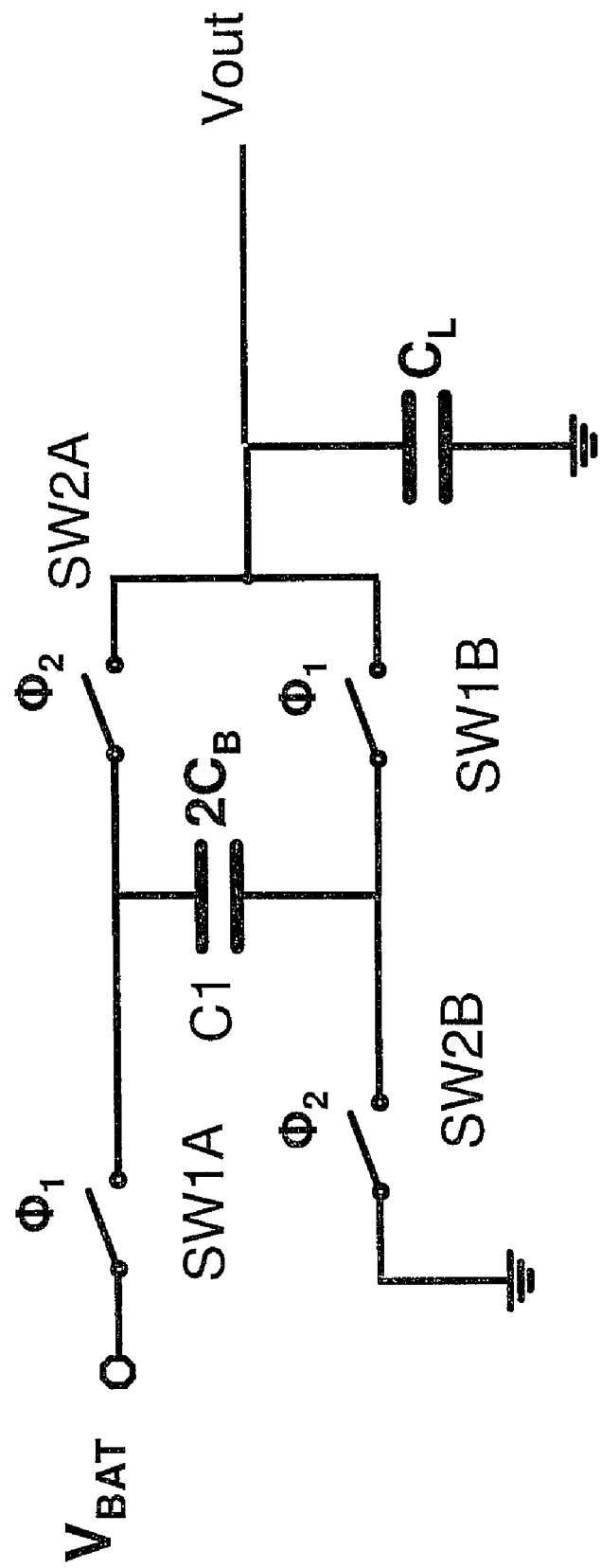
FIG. 4 illustrates a circuit diagram of a prior art switched capacitor circuit.
Figure 5:
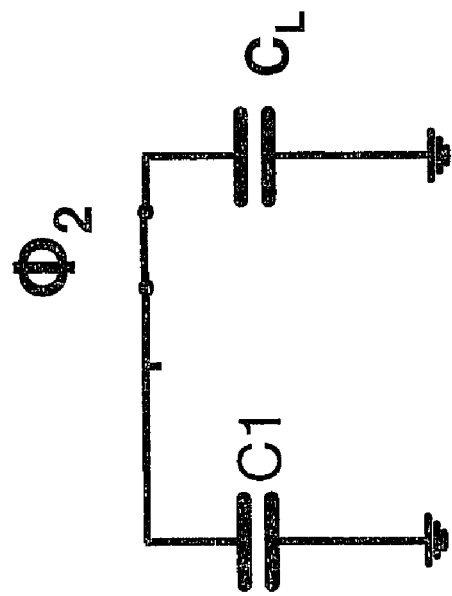
FIG. 5, which includes
Figure 5:
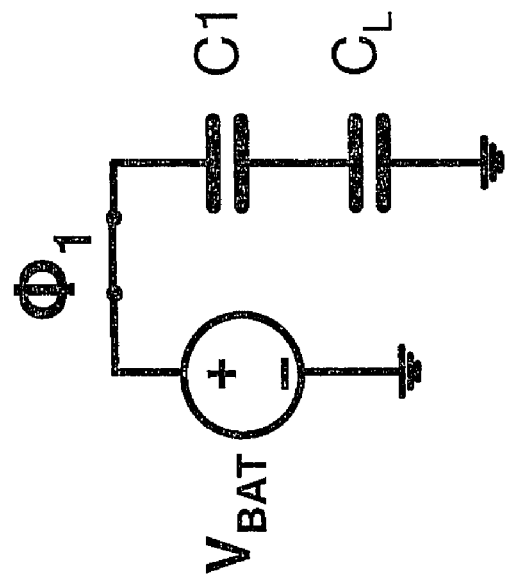

Taking for example the switched capacitor circuit of FIG. 4 with gain 1/2, it can be shown that the energy supplied to the load is:

$$E_L = 8C_B V_L (V_{NL} - V_L) \tag{2}$$

and that the power delivered to the load for this gain setting is:

$$P_L = E_L f_S = 8C_B V_L f_S (V_{NL} - V_L) \tag{3}$$

Thus, in order to modify the power to the load (e.g., to regulate the output voltage Vout as the load current demand increases or decreases), as is readily seen from Equation (3), the available adjustment settings are $E_L$, $f_S$, and the value of the transfer capacitance $C_B$. As described above in the background, some prior art control methods approach the regulation by using a variable switching frequency modulation or PFM to adjust the switching frequency $f_S$. Alternatively, the energy delivered to the load may be adjusted, for example, using duty cycle control approaches such as PWM control to adjust the pulse width or switch segment control to modulate the output current being supplied to the load. The problems with these approaches are discussed above.

The preferred embodiments of the present invention use a novel approach to voltage output regulation. In contrast to the control approaches of the prior art, in the preferred embodiments of the present invention, the transfer capacitance value is dynamically adjusted to regulate the power to the load. This is accomplished by using a technique referred to as digital capacitance modulation (DCM). In additional preferred embodiments, this approach is combined with a DC gain adjustment to further set the overall circuit efficiency as high as possible. Other preferred embodiments provide rapid adjustments to the transfer capacitance in certain situations, and a special low load operating mode to increase efficiency even further.

The approach used in a first preferred embodiment is to segment the transfer capacitance into a switched matrix of capacitance banks, and to use a hysteretic control loop approach to dynamically adjust the transfer capacitance (by turning different switches on and off to control the transfer capacitance value), while maintaining a constant switching frequency $f_S$, in order to regulate the power output.

The many advantages of such an approach to providing a regulated DC voltage may be better understood if the loss mechanisms for the converter circuit are considered. The efficiency of a switched capacitor converter circuit is impacted by at least three primary loss mechanisms: (1) a linear conduction loss that occurs due to the act of charging the transfer capacitor through a switch; (2) loss caused by the bottom plate parasitic capacitance due to the bottom plate of the charging capacitor being shunted (switched) to ground every cycle; and (3) loss due to the switches themselves, that is loss due to charging and discharging the switches (typically N-MOS, P-MOS FETs, or transfer gate switches formed from both an N-MOS and a P-MOS FET).

An expression for the overall efficiency may be obtained:

$$\eta_{ov} = \frac{E_L}{E_B + E_{BP} + E_{SW}} = \qquad (4)$$

$$(1 - \Delta V / V_{NL}) \left[ \frac{1}{1 + K_P V_{BAT} / \Delta V + K_S f_s V_{BAT} / \Delta V} \right].$$

In the overall efficiency equation (4), the first term or preterm is due to conduction losses. The first term in the denominator is due to bottom plate loss characteristics, and the second term is due to switching losses. Examination of the terms reveals that the efficiency is apparently not dependent on the area of the capacitors, and the switching loss can be reduced by lowering $f_S$, which may be done by increasing the capacitor area by the same amount (due to term $K_S f_S$).

The approaches of the prior art, e.g., pulse frequency modulation (PFM) and duty cycle regulation approaches (PWM), or segmented switch regulation, all suffer from loss mechanisms that do not scale well with lower output power. In contrast, the digital capacitance modulation (DCM) approach of preferred embodiments of the present invention disclosed herein provides loss mechanisms that scale well with load power. As the output power is decreased in switched capacitor circuits using the DCM technique, the number of capacitor banks used will also decrease and the switches required will decrease, so that losses due to switching and bottom plate parasitic effects will also decrease. Further, the use of capacitor ratios to regulate the output voltage produces an output voltage regulation that is process independent, that is, process variations in the capacitors will tend to cancel out. The prior art approaches tend to be very dependent on process and thus subject to process variation problems. This is not so with the preferred embodiments of the present invention.

Figure 6:
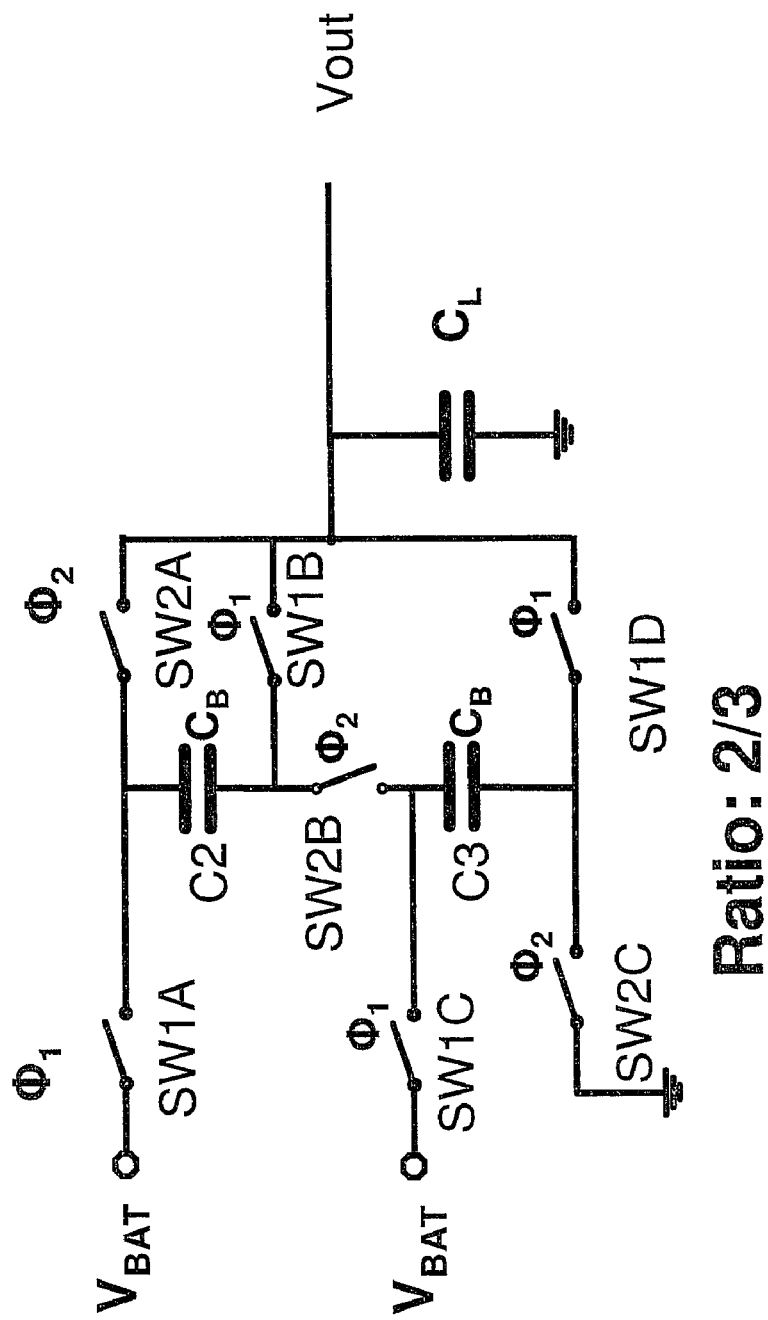
FIG. 6 illustrates an alternative prior art switched capacitor circuit.
Figure 7:
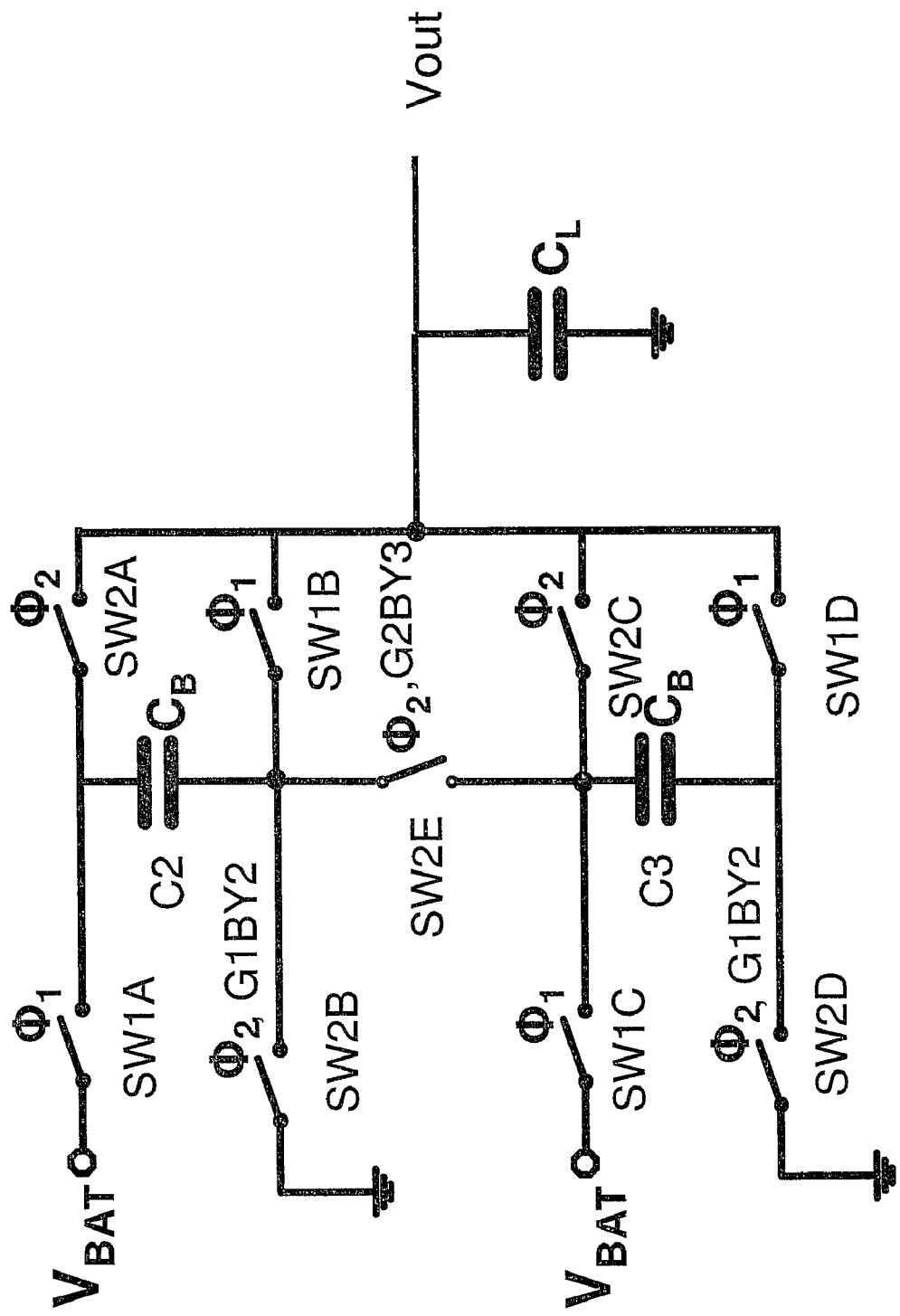
FIG. 7 illustrates in a circuit block diagram a first preferred embodiment of a switched capacitor circuit of the invention having selectable gain.

FIG. 7 depicts a simple illustration of a preferred embodiment single capacitance segment circuit implementation of the segmented transfer or "flying" capacitor of the DCM scheme. In FIG. 7, capacitors C2 and C3, each with value $C_B$ may be selectively used to form a 1/2 gain stage switched capacitor segment or a 2/3 gain stage switched capacitor segment. This is accomplished by selectively operating the switched circuit in two modes. During the phase of operation when clock $\Phi_1$ is high, switches SW1A, SW1B, SW1C and SW1D are closed. An examination of the circuit of FIG. 7 then reveals that in this "common" phase, capacitors C2 and C3 are both coupled between the battery input $V_{BAT}$ and the output terminal Vout, so both capacitors are receiving charge from the battery (or other DC voltage source). Put another way, during the first phase or common phase, the circuit operates in the same manner as the 2/3 implementation of FIG. 6.

During the second phase of operation, when clock $\Phi_1$ is low, clock $\Phi_2$ is high (again, non-overlapping with clock $\Phi_1$). Switches SW2A and SW2C are closed. Switches SW2B and SW2D are closed when the selection has been made to place the gain at 1/2 (G1BY2) as indicated by the signal label $\Phi_2$, G1BY2 in FIG. 7. However, if the selection has been made to place the gain at 2/3 (G2BY3) as indicated by the signal label $\Phi_2$, G2BY3 in FIG. 7, switch SW2E is closed but the other switches SW2B and SW2D remain open.

In operation, control switching signal $\Phi_2$, G1BY2 of FIG. 7 then causes capacitors C2 and C3 to be connected to form the circuit of FIG. 4 (with a gain of 1/2). If instead the gain is set at 2/3, control switching signal $\Phi_2$, G2BY3 causes capacitors C2 and C3 to act as the circuit of FIG. 6. So, regardless of which of the signals $\Phi_2$, G1BY2 or $\Phi_2$, G2BY3 is active during the second phase, or gain phase, of the operation of the switched capacitor circuit, the gain is controlled. The preferred embodiment illustrated in FIG. 7 is exemplary and provides a simple selection between two gain settings. One skilled in the art will recognize that other gain settings may be similarly implemented and additional control signals provided, or different gain settings used. These variations provide additional preferred embodiments that are also contemplated as part of, and within the scope of, the invention and the appended claims.

Figure 8:
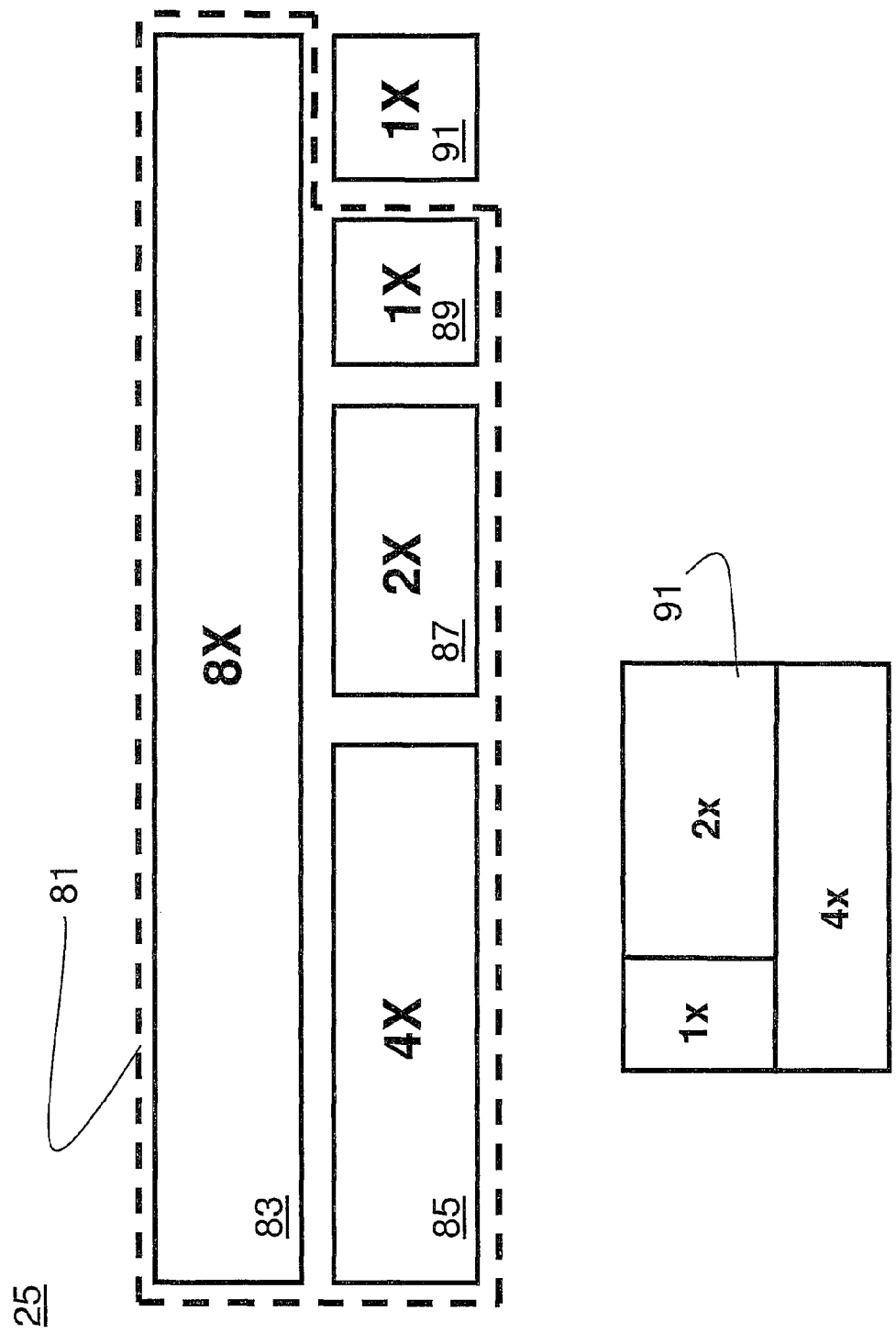
FIG. 8 illustrates in a circuit block diagram a preferred embodiment of a segmented transfer capacitor implemented using switched capacitors.

FIG. 8 provides a block diagram view of one preferred embodiment of a segmentation scheme for the flying or transfer capacitance 25 of a switched capacitor converter. In FIG. 8, block 81 is a capacitance bank for COARSE capacitance adjustments. Block 91 is a capacitance bank for FINE adjustments. Block 83 is a capacitance weighted 8× a unit capacitance value $C_B$. Block 85 is a capacitance weighted 4× a unit capacitance value $C_B$. Block 87 is a capacitance weighted 2× a unit capacitance value $C_B$. Block 89 is a capacitance weighted 1× a unit capacitance value $C_B$. Block 91 is a block which can provide in total a FINE adjustment that has a maximum capacitance of unit capacitance $C_B$. Note that the switches used to switch each bank into the transfer capacitance are also scaled in size (8×, 4×, 2×, 1×) so that the stages scale in all respects.

FIG. 8 further depicts the details of the fine segment block 91. Block 91 has three capacitances within it that may be selectively enabled, one that is 1/7th of unit capacitance value $C_B$, one that is 2/7th of unit capacitance value $C_B$, and one that is 4/7th of unit capacitance value $C_B$. Thus, the capacitance 16 $C_B$ is available as a maximum value if all of the blocks 83, 85, 87, 89 and 91 are enabled and all three segments of block 91 are enabled.

One skilled in the art will recognize that the weighting scheme of FIG. 8 is a binary or logarithmic weighting scheme. That is, the weights in block 81 are 1× the unit capacitor value $C_B$, and 2×, and 4×, and 8×. In addition, a fine mode segmentation of block 91 provides fractional weights of $C_B/7$, $2C_B/7$ and $4C_B/7$. This approach has the advantage that by using 6 simple control lines, 4 for the coarse block 81 and 2 for the fine block 91, the transfer capacitance may be easily varied between values of 7 $C_B$ (at the lowest weight) and 16 $C_B$ at the maximum (15 $C_B$ plus 7 $C_B/7$).

However the segmentation of FIG. 8 is but one non-limiting example of a preferred approach to the transfer capacitor segmentation scheme, and one skilled in the art will recognize that other segmentation schemes for the flying or transfer capacitor could be used, and the scope of the claims appended to this application contemplates these variations. For example, in applications where different control lines are available or desirable, more segments with different weights, or fewer segments with different weights, may be used with the digital capacitance modulation scheme of the preferred methods. These alternative approaches are also contemplated as part of the preferred embodiments of the invention and are within the scope of the appended claims.

Figure 9:
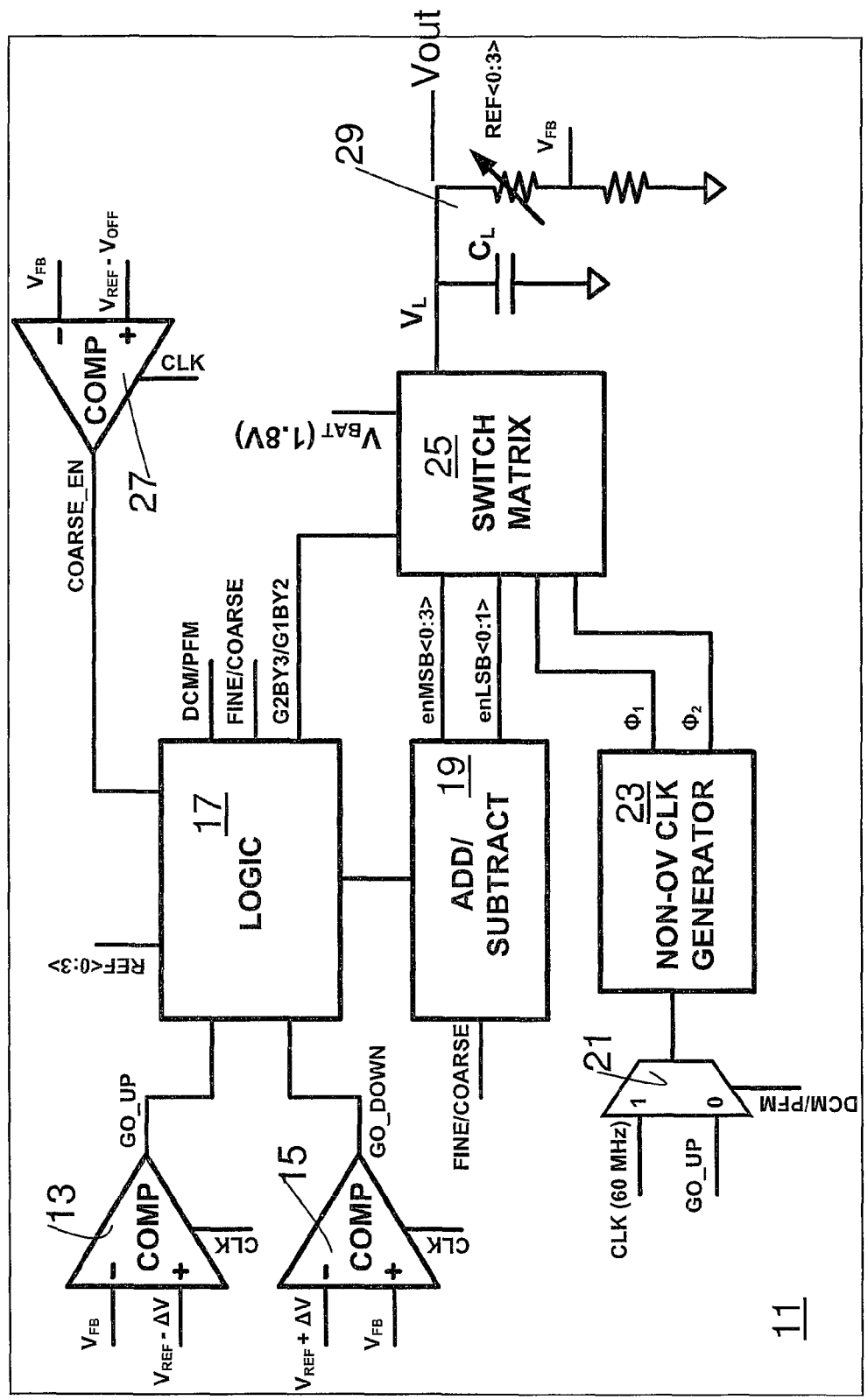
FIG. 9 illustrates in a circuit block diagram a preferred embodiment of a DC-DC converter circuit incorporating the features of the invention.

FIG. 9 depicts a circuit block diagram of a preferred embodiment switched capacitor converter circuit 11. Circuit 11 may be implemented as a stand alone integrated circuit, or preferably and more likely as part of an SOC or SOIC integrated circuit or system. Switch matrix 25 includes the segmented switched capacitances of FIG. 8, the switches needed to implement the switched capacitor operations during the clock $\Phi_1$ and clock $\Phi_2$ cycles, and the gain selections G1BY2 and G2BY3 of the preferred embodiments as described above. The switches are preferably N-MOS or P-MOS FET transistors and, less preferably, may be transmission gates which incorporate both of these transistor types. The capacitors may be implemented in any known fashion to provide integrated circuit capacitors, for example N-poly plates over N-well plates with a dielectric, typically an oxide, nitride, ON, ONO or other well known dielectric, including SiON and SiOCN as non-limiting examples, between the plates. Alternatively, the capacitors may be formed above the substrate using MiM (metal insulator metal) or MoM (metal oxide metal) arrangements and may have a variety of shapes, such as a crown, a trench, and a comb. Other known methods for forming capacitors as on-board components on an integrated circuit are also contemplated.

The multiplexer 21 enables the circuit 11 to implement an additional preferred embodiment using PFM regulation control. This is done to increase the efficiency of the circuit 11 at very low loading levels, such as when no load circuit power is used, as in sleep or stand-by modes used in battery-powered devices. This PFM feature is not required in other preferred embodiments and so multiplexer 21 may be omitted for those embodiments. The clock generator 23 receives the clock input, for example a 60 MHz clock is indicated, however the invention is not limited to any specific frequency and other frequencies may be used. The clock generator 23 generates clocks $\Phi_1$ and $\Phi_2$ as described above, which are non-overlapping clock pulses. Add/subtract block 19 outputs the "enable" signals to the switch matrix 25. As will be further described, one of the "enable" signals goes to each of the segments of the segmented transfer capacitor in switch matrix 25, each enabling one of the weighted segments to be included in the transfer capacitance as shown in FIG. 8. Logic block 17 provides, using digital logic circuitry, the control signals needed to set the overall DC gain (G1BY2, G2BY3) of the circuit 11, to cause the circuit to operate in FINE and COARSE adjustment modes, and to operate in either digital capacitance modulation (DCM) or PFM modes by controlling multiplexer 21. Resistor ladder 29 creates a feedback voltage $V_{FB}$ between the output voltage Vout and ground, and a user settable resistor network is used to set the desired output using a four-bit control field REF<0:3>. (Of course, other values could be used, as is clear to those skilled in the art.) This user settable output voltage level will determine the output voltage Vout the circuit is regulated to during operation, and is used by the logic block 17 to set the DC gain control to G1BY2 or G2BY3.

Logic block 17 is implemented using digital logic circuitry in a control function. Known techniques such as digital synchronous state machines, programmable micro controllers, processors, DSPs, RISC cores, gate arrays, ROMs, EPROMS, flash and the like may be used to implement this block. Typically a clocked state machine and digital logic circuitry will be used.

Comparators 13 and 15 are used to set the bounds needed to implement the hysteretic control loop. An allowable voltage threshold variance $\Delta V$ is provided. A reference voltage $V_{REF}$ is also provided, for example from a bandgap reference. When the sensed feedback voltage from the output $V_{FB}$ is less than the trigger voltage ($V_{REF}-\Delta V$), the comparator 13 puts out a GO_UP signal. When the sensed voltage $V_{FB}$ is greater than the trigger voltage ($V_{REF}+\Delta V$), comparator 15 puts out a GO_DOWN signal. These comparisons are used with logic block 17 to provide the control loop of the circuitry.

Comparator 27 provides additional control. When the observed output voltage $V_{FB}$ is less than the voltage difference ($V_{REF}-V_{OFF}$), the output voltage has fallen rapidly and is quite a bit lower than desired. In order to enable the circuit to rapidly resume proper output regulation, the logic block 17 will respond to the COARSE_EN signal by rapidly adjusting the transfer capacitance using the enable lines enMSB<0:3> to the switch matrix 25.

The operation of the preferred embodiment of FIG. 9 is as follows. The circuit 11 uses hysteretic control. The circuit 11 maintains the output voltage Vout so that the observed feedback voltage $V_{FB}$ is held between the values ($V_{REF}+\Delta V$) and ($V_{REF}-\Delta V$) which defines a hysteretic band. In one preferred method, the feedback voltage $V_{FB}$ is obtained by a resistor ladder 29, which is digitally controlled by a four-bit reference signal labeled REF<0:3> in FIG. 9. The reference voltage $V_{REF}$ is obtained from a known voltage, for example, a bandgap reference source may be used. The input voltage $V_{BAT}$ is supplied by a battery or other supply voltage, and may be, for example, 1.8V as is known in the art. Any other voltage input may be used.

Logic block 17 receives the signals GO_UP and GO_DOWN from the comparators 13 and 15, respectively. When the observed voltage $V_{FB}$ is below the hysteretic band, the comparator 13 puts out the GO_UP signal. The logic block 17 then outputs a signal to the add/subtract block 19 to cause it to add to the enable value that determines the value of the transfer capacitance in the switch matrix 25. The circuit 11 then causes the add/subtract block 19 to increment either the output enMSB <0:3> (for coarse mode control) or the output enLSB <0:1> (for fine mode control) to the switch matrix 25 to increase output voltage Vout. When the observed voltage $V_{FB}$ is above the hysteretic band, the comparator 15 puts the GO_DOWN signal out to logic block 17. The logic block 17 then outputs a signal to the add/subtract block 19 to cause it to decrease the value enMSB <0:3> (for coarse mode control) or enLSB <0:1> (for fine mode control) to the switch matrix 25. This will cause a decrease in the output voltage Vout because the enable signals determine the active segments in the segmented transfer capacitance of switch matrix 25. In this manner, the circuit 11 attempts to maintain the output voltage Vout in the desired hysteretic range over a variety of conditions of load power demand.

The preferred embodiment of the converter circuit of FIG. 9 also illustrates the use of several additional preferred embodiments which are advantageously used in implementing the embodiments of the invention, but which may be omitted as well. Comparator 27 provides the "COARSE_EN" signal that automatically allows the circuit 11 to adjust between a coarse mode and a fine mode of digital capacitance modulation operations.

When the output voltage Vout falls rapidly, the load has suddenly demanded an increase in power. If the output voltage Vout falls beneath the value $V_{FB}-(V_{REF}-V_{OFF})$, the signal COARSE_EN is active, indicating a coarse mode of regulation is enabled. In this mode, the adjustments made by the add/subtract block 19 will be made by incrementing (GO_UP signal is active) or decrementing (GO_DOWN signal is active) the four-bit control word enMSB<0:3>. This mode of operation allows for fast adjustment of the transfer capacitance in increments or decrements of the unit value 1 $C_B$, thereby allowing the circuit 11 to rapidly settle to the desired output value.

Once coarse mode regulation is achieved and the feedback voltage $V_{FB}$ is within the hysteretic range, the fine mode of operation is used and signal COARSE_EN is no longer active. In fine mode, the transfer capacitance of switch matrix 25 is adjusted, in response to a GO_UP or GO_DOWN signal, in increments or decrements of value $2C_B/7$, using the control word bits enLSB<0:1>. Taking the two control signals enMSB and enLSB together, the six-bit control word is adjusted incrementally to achieve voltage regulation. This fine step size, used when the output voltage Vout is nearly perfectly regulated and when the output power load is not changing rapidly, enables the circuit 11 to settle within narrow hysteretic bands without unwanted oscillations.

The transition between the coarse mode and the fine mode of operation may be automatically determined using the existing signals. When the output voltage Vout is nearly regulated, the logic block 17 may detect a situation where there is a GO_UP signal followed immediately by a GO_DOWN signal. In this situation the output voltage Vout is very nearly regulated at the required value, that is, the load voltage is transitioning from a falling to a rising mode, a local minimum has been reached, and the fine mode of regulation may be efficiently used. Another transition from coarse mode to fine mode is made when the four bits of the control word enMSB<0:3> are all zero and a GO_DOWN signal subsequently occurs. In this case, the load power is very low and again the fine mode of regulation may be efficiently used.

The signal COARSE_EN is active when the converter transitions from a fine mode of regulation to a coarse mode. This happens, for one example, when the circuit 11 needs to rapidly adjust the output voltage Vout, for instance at power up. The big increase in load power in these situations leads to a fall off in the output voltage Vout so that feedback voltage $V_{FB}$ falls below the trigger value $V_{REF}-V_{OFF}$. The change to coarse mode enables the circuit 11 of FIG. 9 to rapidly settle when there is a sudden change in the load power. The threshold value $V_{OFF}$ may be set by the user or designer depending on the application circuit requirements. At power up, the circuit 11 always begins in COARSE mode to quickly ramp up output voltage Vout.

The use of two modes of regulation is advantageous. If only the coarse mode is used, then the selected hysteretic band has to be wide enough to prevent the circuit from oscillating from a GO_UP signal to a GO_DOWN signal on alternating cycles when the output voltage Vout is more or less regulated. These oscillations would appear on top of the regulated DC output voltage at a frequency which is a complex function of load current, the value of the capacitors $C_L$ and $C_B$, and the output voltage Vout. Oscillations produce unwanted noise or tones that signaling applications, such as cellular or wireless transceiver circuitry, cannot tolerate. The introduction of the fine mode of operation in the preferred embodiment prevents this unwanted oscillation and allows a narrower hysteretic band to be used efficiently for better regulation of the output voltage Vout.

The circuit 11 of FIG. 9 provides a switched capacitor DC converter that will operate efficiently for many conditions. However, in the condition where there is a very light load demand for current, such as in a "stand by" or "sleep" mode of operation for a battery-powered device, the circuit 11 is not as efficient as desired in switched capacitor mode. The switches that correspond to the capacitor banks are constantly being turned on and off, and switching losses cannot be lowered past a certain point. The minimum amount of power lost due to switching will depend on the value of the load capacitance $C_L$, the switching frequency $f_S$, and the value of the lowest capacitance segment bank the circuit 11 can use ($C_B/7$). If load power becomes low enough, the constant power loss due to switching will significantly reduce the efficiency of the circuit 11.

To further enhance the operation of the circuit 11 in these low load or no-load conditions, the preferred embodiment of FIG. 9 also incorporates an optional PFM (pulse frequency modulation) mode at low load power. In PFM mode, the circuit of FIG. 9 is no longer a fixed frequency converter but now the clock to the non-overlapping clock generator block 23 is determined by the GO_UP signal multiplexed into the clock line by control signal DCM/PFM from the logic block 17.

The transition to this low load mode of operation may be automatically determined by the logic block 17 from the existing signals. When the enMSB and enLSB control words are all zero, and a GO_DOWN signal is output, the output voltage Vout is continuing to rise even though the flying capacitance is at its lowest available value ($C_B/7$ in this example). Thus the load is not demanding any current. When the logic block 17 detects this situation, it will transition to the low load mode of operation and output a zero on the control line DCM/PFM, which causes the clock signal CLK to be replaced with the GO_UP signal.

As the output voltage Vout falls, the circuit 11 will periodically clock the non-overlapping clock signal CLK when GO_UP is high. If the GO_UP signal repeats for several cycles, this indicates the load is actively demanding current and the logic block 17 then transitions back to the normal, DCM, mode of operation by outputting a "1" on the logic signal DCM/PFM.

Normally the use of PFM regulation, as discussed in the background section, produces unwanted tones or spurs in the output. However, in cases where the load is not operating, this noise source is acceptable, and the increase in efficiency is simply obtained by the logic block 17 observing already existing signals. Once operation of the load resumes, the control circuitry will transition the operation back to the normal DCM mode of operation.

Figure 10:
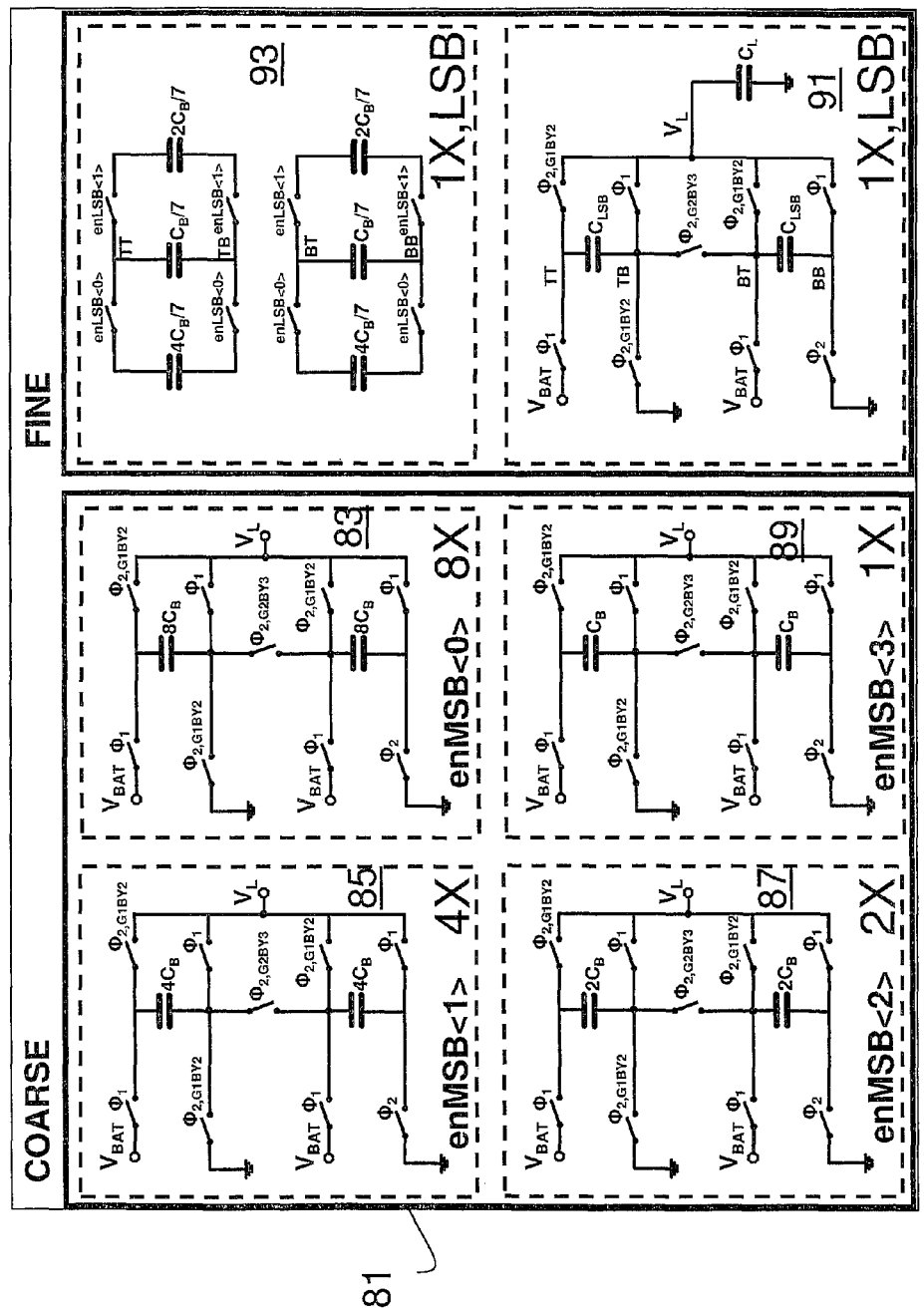
FIG. 10 illustrates in a block diagram a detailed view of the control lines and segmented capacitors of a preferred embodiment implementation of a segmented transfer capacitor as shown in FIG. 8.

FIG. 10 depicts in further detail the implementation of the flying capacitance segments used in the switch matrix 25 in FIG. 9. In FIG. 10, the details of the control signals enMSB<0:3> and enLSB <0:1>, and corresponding switch operations can be seen. For example, in the COARSE section block 83 with 8× weight, the 8× transfer capacitors are enabled when the signal enMSB<0> is high. The weight of the capacitors is $8 C_B$ in this segment, and the switch sizes will also scale so that the switching speed and switching current will scale with the capacitances.

Similarly, block 81 of weight 4× is enabled when the control signal enMSB<1> is high. Examination of FIG. 10 then reveals that the coarse block 81 can provide up to 16 different values of capacitance from $0 C_B$ to $15 C_B$ corresponding to the values from '0000' to '1111' based on the control word enMSB<0:3>. Similarly, the fine block 91 can provide values in increments of $2 C_B/7$ using two control signals enLSB<0:1>. A nominal value of $1 C_B/7$ is always active, and by using the switches of block 93, the value may include an additional $2 C_B/7$, or $4 C_B/7$, or both. Thus the values available from the FINE section 91 are $1 C_B/7$, $3 C_B/7$, $5 C_B/7$ and $7 C_B/7$ for the four possible values '00'-'11' for the control word enLSB<0:1>. These fractional values are added to the value from the COARSE section 81 so that the range provided by switch matrix 25 for the flying capacitance is from $1 C_B/7$ to $16 C_B$ ($15 C_B$ plus $7 C_B/7$) when all control signals are '1'.

Those skilled in the art will recognize that this implementation is but one possible implementation, and other implementations for the switch matrix 25 are contemplated as part of the present invention and are within the appended claims.

Figure 11:
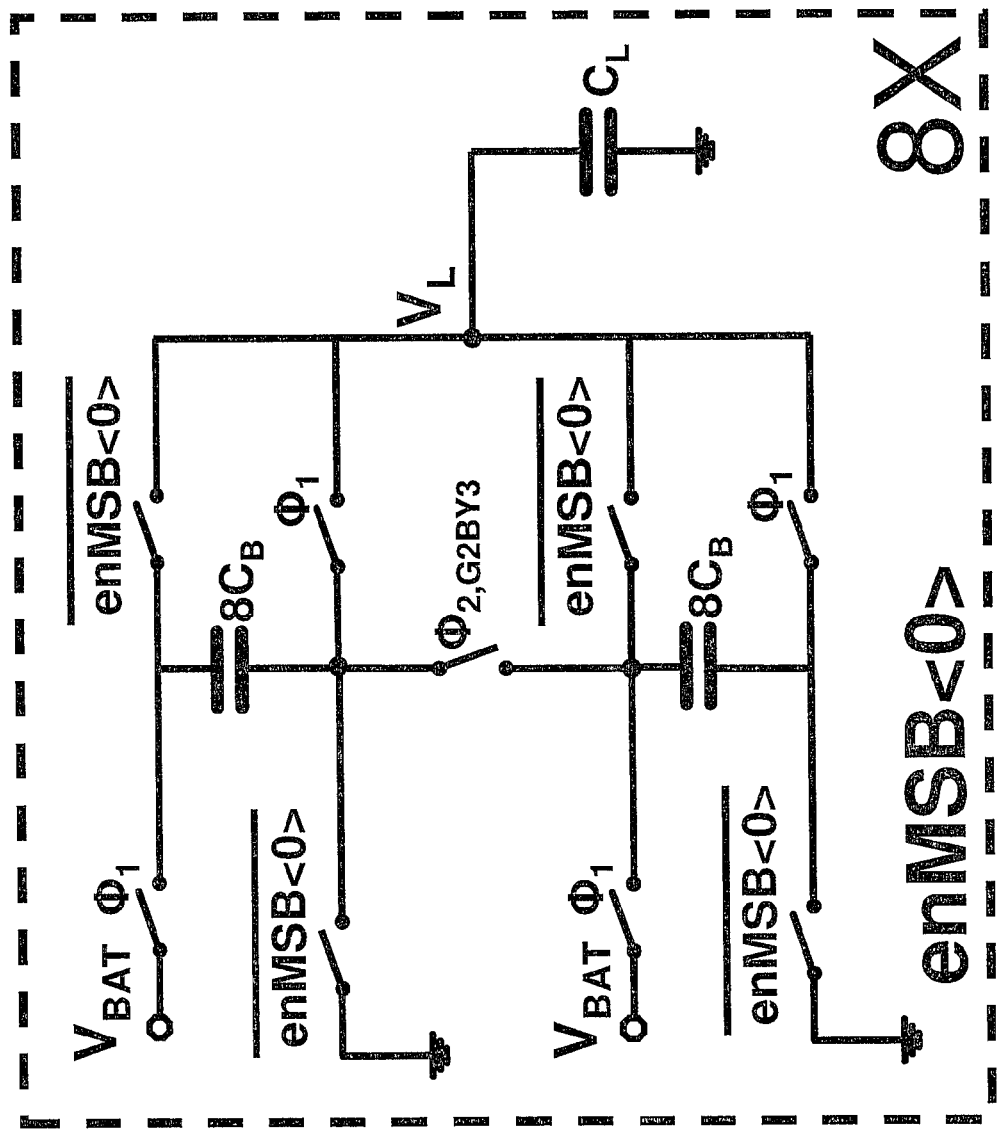
FIG. 11 illustrates in a simple circuit diagram an alternative preferred embodiment of a segmented transfer capacitor of the invention.

A further preferred embodiment of the switched capacitor stages is now presented which, when used with a circuit such as the circuit 11 embodiment illustrated in FIG. 9, provides additional advantages in use of the invention. In FIG. 11, a switching circuit of FIG. 7 is depicted that will further switch unused capacitor segments from the switched capacitor bank used to provide a segmented transfer capacitance value into the load capacitor $C_L$. Thus, when the enable signals for a particular transfer capacitor segment stage are not active, these unused capacitors are switched into the load capacitor $C_L$ and its value is therefore increased. In FIG. 11, only the circuitry for a bank for one segment (the 8×) segment is shown. In practice, every bank in switch matrix 25 as shown in FIG. 10 would be modified in this enhanced manner.

The advantage of this additional preferred embodiment is that increasing the load capacitor value $C_L$ reduces the output voltage ripple as the load voltage falls. By using the same switches that are already used to enable the capacitor segment, the total area occupied by the on-chip converter circuit is not increased for this additional enhancement.

In one exemplary implementation of the preferred embodiment of FIG. 9, the total $C_L$ was 680 pF and $C_B$ was 440 pF. These values are chosen based on a load current demand of 10 mA, and a 160 mV voltage dip from no load to full load. The invention however is not dependent on any specific capacitance size. Any values could be chosen and used based on specified transient performance and area limitations.

A preferred method of the present invention thus provides a load capacitor coupled between an output voltage and a ground reference potential. A switched capacitor circuit including a transfer capacitor coupled to the load capacitor and selectively coupled to a voltage supply and selectively coupled to the ground reference potential is provided to clock the switch capacitor at a fixed frequency to alternatively charge the transfer capacitor by coupling it between the battery supply and the output terminal and then to discharge the transfer capacitor by coupling it between the output terminal and the ground reference potential. The method also monitors the output voltage and determines when it is above a first threshold and determines when it is below a second threshold, and modulates the value of the transfer capacitor responsive to the monitoring of the output voltage to maintain the output voltage between the second threshold and the first threshold.

In additional preferred methods, providing the transfer capacitor further comprises providing segmented capacitance circuits that are selectively enabled responsive to control lines, and providing control circuitry for increasing the transfer capacitance to increase the output voltage and for decreasing the transfer capacitance to decrease the output voltage by enabling and disabling segments of the segmented capacitance circuits responsive to the monitoring circuitry. In additional preferred methods, providing the control circuitry further provides a coarse mode of adjustment and a fine mode of adjustment wherein, in the coarse mode of adjustment, the transfer capacitor is adjusted in increments or decrements of a unit capacitor value each cycle and in the fine mode of adjustment, the transfer capacitance is adjusted in increments or decrements of fractions of the unit capacitor value.

In additional preferred methods of the invention, providing segmented capacitor values for the transfer capacitor further provides a plurality of weighted switched capacitor circuitry that implements a logarithmic scale. In further preferred methods, providing the segmented capacitor values further provides switched capacitor circuitry that is weighted in fractions of a unit capacitor value.

In further preferred methods, providing the segmented capacitance circuits further provides switched capacitor circuitry that selectively provides a first gain and a second gain. In another preferred method, the first gain is a first ratio and the second gain is a second different ratio, and control circuitry is provided to perform as a stepped-down DC-DC converter by outputting an output voltage that is less than the supply voltage.

Additional preferred methods provide digital capacitance modulation circuitry by providing digital control logic to control the switches and to clock of the transfer capacitance circuitry. In another preferred method, a low power mode of operation is provided using pulse frequency modulation to lower the switching frequency when the output voltage monitor indicate there is no power demanded at the output. In another preferred method, the low power mode of operation is entered when the control circuitry indicates the segmented transfer capacitance should go below its lowest setting. In another preferred method of operation, the low power mode of operation is needed when the control circuitry indicates that the transfer capacitance should be increased above its lowest setting over several cycles when the low power mode is enabled.

In an additional preferred method, a coarse mode of adjustment is entered at power up. In an additional preferred method, a coarse mode of operation is entered into when the output voltage falls below a predetermined threshold voltage set by a user. In another preferred method, the coarse mode of operation is ended and a fine mode of operation begins when the control circuitry detects an output voltage above the first threshold on one clock cycle and below the second threshold on a subsequent clock cycle. In the fine mode of operation, adjustments to the transfer capacitance are made in fractions of a unit capacitance.

Figure 12A:
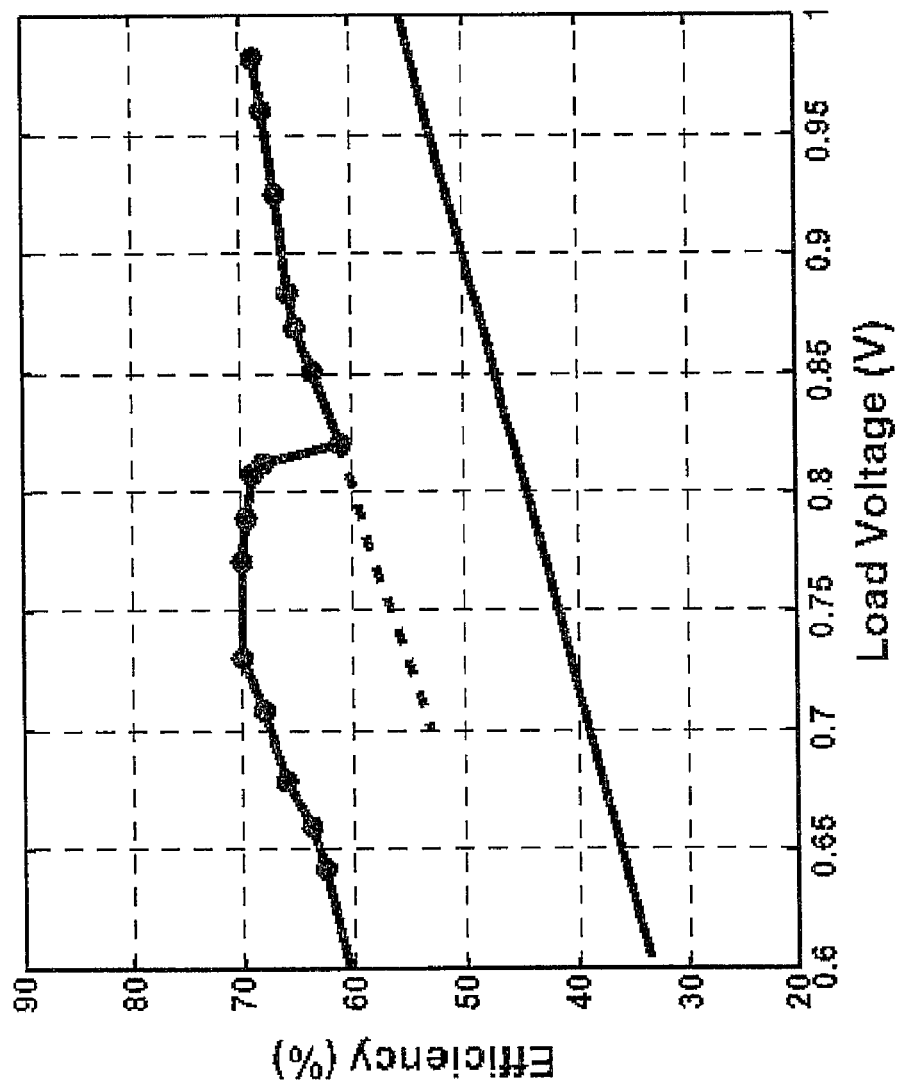

The advantages of a practical circuit incorporating preferred embodiments of the invention may be seen from FIG. 12. In FIG. 12, the efficiency of a digital modulated capacitor converter circuit implemented in an exemplary 65 nanometer semiconductor process was measured. In the first example, the graph of FIG. 12*a* depicts efficiency results obtained when the capacitors used for the segmented transfer capacitors in switch matrix 25 and the load capacitors $C_L$ were implemented using traditional N-doped polysilicon over an N-well bottom plate to form the capacitors. Capacitance values of 10 femtoFarads/um$^2$ are obtained. As seen from FIG. 12*a*, a gain switching method such as described above with respect to FIG. 7 was used to switch between a 2/3 and a 1/2 gain setting. The efficiency curve above 0.82V load voltage and including the dashed line shows the results when the DC gain was set at 2/3. The curve below that setting shows the results when the gain was at 1/2. In a practical application using the preferred embodiment of FIG. 9, for example, the gain setting can be determined from the user defined resistor setting used to set the value for $V_{FB}$. The transition point is chosen from the higher setting to the lower setting to maximize the efficiency by keeping the no load voltage close to the load output voltage.

As can been seen in FIG. 12*a*, the efficiency of the preferred embodiment circuit in this example implementation was 70% at a load voltage of 0.8V, with an input supply $V_{BAT}$ of 1.8V and a load current of 8 milliamps. This is higher than the efficiency of a similarly measured LDO circuit of the prior art, as shown by the bottom curve in FIG. 12*a*. At 0.7V load voltage the improvement obtained using the preferred embodiment DC converter is about 28% (increased efficiency), and the use of the methods and circuitry of the preferred embodiments resulted in a savings of 2.9 milliamps in current over an LDO circuit. At 1.0V with a 10 milliamps load current, the digital capacitance modulation circuitry of the preferred embodiment still obtained an efficiency of 70%, which is still far greater than the LDO circuit, and saves an estimated 2.1 milliamps in current.

However using the N-poly N-well capacitors as circuit elements uses a substantial amount of silicon area. In a typical semiconductor process this represents a 0.082 mm area penalty over the LDO. This can be further improved upon by using, in another preferred embodiment, so called "over IC"

capacitors formed above the substrate in the metal dielectric layers. For example, MiM (metal, insulator, metal) or MoM (metal, oxide, metal) capacitors can be used, and multilayer capacitors can be used. In one example implementation, capacitors of 50 femtoFarads/um$^2$ were obtained.

Figure 12B:
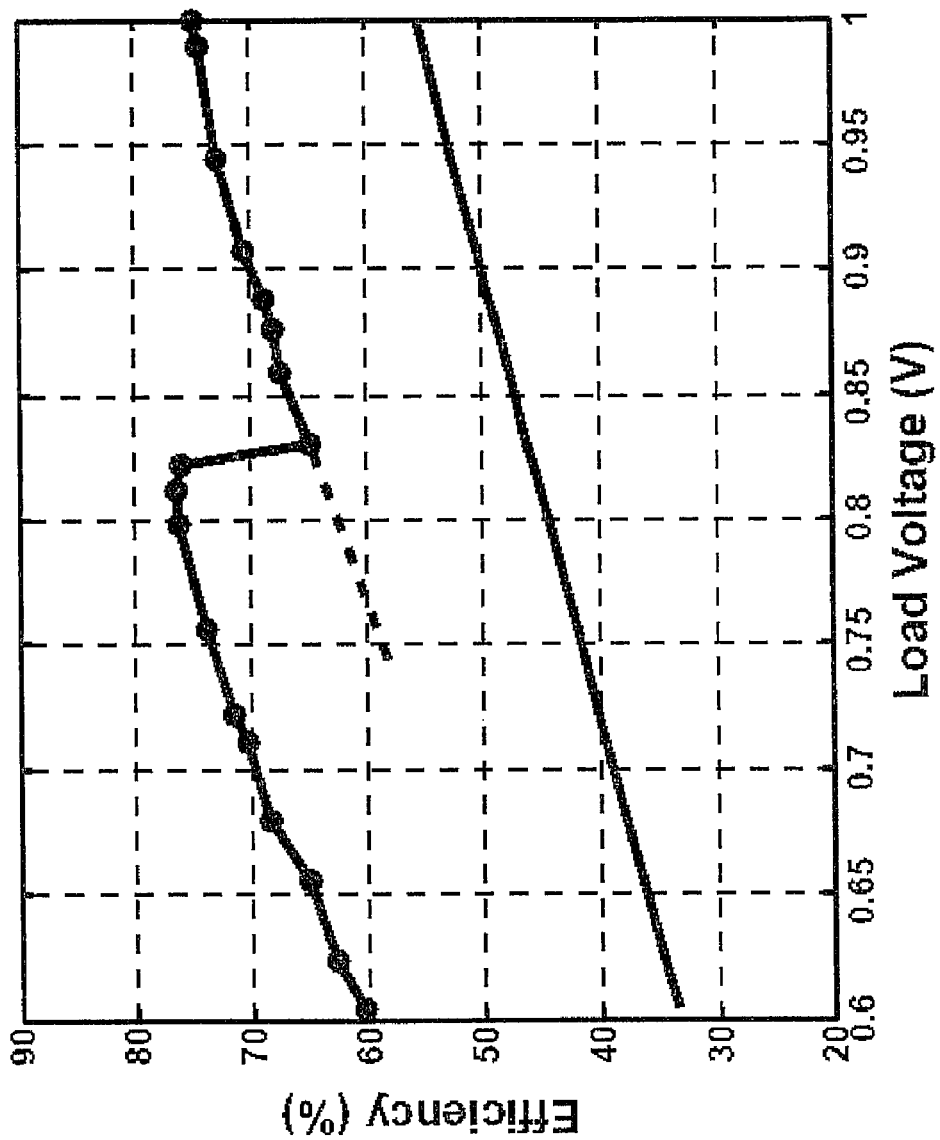

FIG. 12b illustrates the efficiency results obtained in this example of a preferred embodiment digital capacitance modulated circuit, again implemented in an exemplary 65 nanometer semiconductor process. In FIG. 12b, the top curve illustrates the results of the use of the preferred embodiment circuitry with over IC capacitors having increased values. Advantages obtained with this embodiment are that the circuit area is now reduced to a size below that for a comparable LDO, while efficiency is actually increased. The reason is that the bottom plate losses are now reduced as the over IC capacitors have lower losses. The use of these types of capacitors may add processing steps and costs to the implementation. If that is undesirable, the N-poly N-well capacitors may be used and good efficiency is obtained at a lower cost.

Thus advantages of the use of the preferred embodiments are that the method and circuitry provides a semiconductor process compatible, on-board, DC-DC converter circuit that is efficient at a wide range of operating voltages, is efficient under power down or sleep mode, or no-load, conditions, and rapidly adjusts to changes in load power. Efficiency obtained is greater than an LDO circuit of the prior art. If high density capacitors are used, an area savings in silicon is also obtained over the prior art. No external components are required. Losses due to the operation of the circuitry scale with the load voltage and the circuit remains efficient even at low load voltages. Fixed frequency switching is used in active operation so that the unpredictable frequency spectrum tones produced by the PFM modulation switched capacitor circuits of the prior art are not present.

Although the present invention and its advantages have been described in detail, it should be understood that various changes, substitutions and alterations can be made herein without departing from the spirit and scope of the invention as defined by the appended claims. For example, it will be readily understood by those skilled in the art that the methods may be varied while remaining within the scope of the present invention.

Moreover, the scope of the present application is not intended to be limited to the particular embodiments of the methods and steps described in the specification. As one of ordinary skill in the art will readily appreciate from the disclosure of the present invention, processes, or steps, presently existing or later to be developed, that perform substantially the same function or achieve substantially the same result as the corresponding embodiments described herein may be utilized according to the present invention. Accordingly, the appended claims are intended to include within their scope such processes or steps.

What is claimed is:

1. A voltage regulator circuit, comprising:
   a load capacitor coupled between an output terminal and a reference potential;
   a switch matrix comprising a plurality of segmented switched capacitors coupled between a voltage input and the output terminal to provide a transfer capacitor;
   a feedback circuit for producing a feedback voltage representative of a voltage at the output terminal;
   clocking circuitry for producing a first clock signal to operate first switches in the plurality of segmented switched capacitors to couple the capacitors between the voltage input and the reference potential during a first clocking phase, and for producing a second clock signal to operate second switches in the plurality of segmented switched capacitors to couple at least one of the segmented switched capacitors between the reference potential and the output terminal during a second clocking phase, the first clock signal and the second clock signal being non-overlapping clock signals having a fixed frequency; and
   control circuitry for selectively coupling at least one of the segmented switched capacitors to the output terminal during the second clocking phase and for increasing and decreasing a number of segmented switched capacitors coupled to the output terminal during the second clocking phase responsive to the feedback voltage in order to regulate an output voltage;
   wherein the plurality of segmented switched capacitors further comprises a plurality of stages of switched capacitor circuits, each stage comprising a first gain selection input coupled to first switches to operate a pair of equally weighted capacitors in series during the second clocking phase and a second gain selection input coupled to second switches to operate the pair of equally weighted capacitors in parallel during the second clocking phase, to selectively provide a first and a second gain, each gain being a fractional gain.

2. The voltage regulator circuit of claim 1, further comprising:
   a reference voltage;
   a first comparator coupled to the control circuitry; and
   a delta voltage,
   the first comparator producing a signal indicating the output voltage should increase when the first comparator detects that the feedback voltage is less than the reference voltage minus the delta voltage.

3. The voltage regulator circuit of claim 2, further comprising:
   a second comparator coupled to the control circuitry and producing a second signal indicating the output voltage should decrease when the second comparator detects the feedback voltage is greater than the reference voltage plus the delta voltage.

4. The voltage regulator circuit of claim 1, further comprising a signal indicating a low load operation and circuitry for substituting a lower frequency clock signal for the fixed frequency clock signals during the low load of operation.

5. The voltage regulator circuit of claim 4, further comprising an add/subtract block coupled between the segmented switched capacitor and the control circuitry, for providing enable signals to stages of the plurality of segmented switched capacitors.

6. The voltage regulator circuit of claim 1, further comprising second control circuitry for coupling unused segments of the switch matrix to the load capacitor.

7. A voltage regulator circuit, comprising:
   a load capacitor coupled between an output terminal and a reference potential;
   a switch matrix comprising a plurality of segmented switched capacitors coupled between a voltage input and the output terminal to provide a transfer capacitor;
   a feedback circuit for producing a feedback voltage representative of a voltage at the output terminal;
   clocking circuitry for producing a first clock signal to operate first switches in the plurality of segmented switched capacitors to couple the capacitors between the voltage input and the reference potential during a first clocking phase, and for producing a second clock signal to operate second switches in the plurality of segmented switched capacitors to couple at least one of the segmented switched capacitors between the reference potential and the output terminal during a second clocking phase, the first clock signal and the second clock signal being non-overlapping clock signals having a fixed frequency; and control circuitry for selectively coupling at least one of the segmented switched capacitors to the output terminal during the second clocking phase and for increasing and decreasing a number of segmented switched capacitors coupled to the output terminal during the second clocking phase responsive to the feedback voltage in order to regulate an output voltage;

wherein the plurality of segmented switched capacitors further comprises:

a plurality of stages of switched capacitor circuits, each stage having an enable signal enabling a pair of switched capacitors of a weight that is a multiple of a unit weight, each stage having a different multiple than the other stages in the plurality, and each stage further comprising a first gain selection input coupled to first switches to operate a pair of equally weighted capacitors in series during the second clocking phase, and a second gain selection input coupled to second switches to operate the pair of equally weighted capacitors in parallel during the second clocking phase, to selectively provide a first and a second gain, each gain being a fractional gain.

8. The voltage regulator circuit of claim 7 wherein the plurality of segmented switched capacitors further comprises a fine mode switched capacitor stage having a pair of switched identical capacitor fractional weighing circuits, each selectively providing a plurality of capacitor values coupled to the output terminal during the second clocking phase that comprise fractions of a unit capacitor value, the fine mode switched capacitor stage further comprising the first gain selection input coupled to the first switches to operate the pair of equally weighted capacitors in series during the second clocking phase, and the second gain selection input coupled to the second switches to operate the pair of equally weighted capacitors in parallel during the second clocking phase, to selectively provide the first and the second gains, each gain being a fractional gain.

9. A voltage regulator circuit, comprising:

a load capacitor coupled between an output terminal and a reference potential;

a switch matrix comprising a plurality of segmented switched capacitors coupled between a voltage input and the output terminal to provide a transfer capacitor;

a feedback circuit for producing a feedback voltage representative of a voltage at the output terminal;

clocking circuitry for producing a first clock signal to operate first switches in the plurality of segmented switched capacitors to couple the capacitors between the voltage input and the reference potential during a first clocking phase, and for producing a second clock signal to operate second switches in the plurality of segmented switched capacitors to couple at least one of the segmented switched capacitors between the reference potential and the output terminal during a second clocking phase, the first clock signal and the second clock signal being non-overlapping clock signals having a fixed frequency;

control circuitry for selectively coupling at least one of the segmented switched capacitors to the output terminal during the second clocking phase and for increasing and decreasing a number of segmented switched capacitors coupled to the output terminal during the second clocking phase responsive to the feedback voltage in order to regulate an output voltage;

a signal enabling a coarse mode of operation, wherein each segmented switched capacitor is adjusted in increments and decrements in value of weight that is at least one unit capacitor increase or decrease each clock cycle; and a second signal enabling a fine mode of operation, wherein each segmented switched capacitor is adjusted in increments and decrements in value of weight that is a fraction of the unit capacitor increase or decrease each clock cycle.

10. An integrated circuit DC-to-DC converter, comprising:

an input for receiving an input voltage;

a load capacitor coupled between an output voltage terminal and a ground potential, the output voltage terminal for supplying a regulated voltage to a load circuit;

a segmented switched capacitor matrix comprising a plurality of weighted switched capacitor circuits selectively coupled between the input and the output voltage terminal, and selectively coupled between the ground potential and the output voltage terminal, responsive to control signals for enabling each of the weighted switched capacitor circuits and responsive to a first and a second non-overlapping clock signal, the plurality of weighted switched capacitor circuits for forming a variable transfer capacitance;

control circuitry for generating the control signals to the segmented switched capacitor matrix in response to comparator signals indicating that an output voltage is below a first predetermined threshold and to signals indicating that the output voltage is above a second predetermined threshold;

a first comparator circuit for comparing a feedback voltage proportional to the output voltage to the first predetermined threshold and for outputting the comparator signals when the output voltage is below the first predetermined threshold;

a second comparator circuit for comparing the feedback voltage to the second predetermined threshold and for outputting the comparator signals when the output voltage is above the second predetermined threshold; and a clock generator circuit for outputting the first and the second non-overlapping clock signals and for receiving a fixed frequency input clock signal;

wherein each of the plurality of weighted switched capacitor circuits has an enable input and a first selectable gain and a second selectable gain, each switched capacitor circuit being coupled to the input in response to the first non-overlapping clock signal and being coupled between the ground potential and the output voltage terminal in response to the second non-overlapping clock signal; and logic circuitry for determining from a feedback voltage setting which of the first and second selectable gains are enabled.

11. The converter of claim 10, further comprising:

circuitry to selectively substitute a lower frequency clock signal for the fixed frequency input clock signal when the output voltage is below a third threshold.

12. The converter of claim 10, further comprising second control circuitry to selectively couple unused portions of the segmented switch capacitor matrix to the load capacitor to increase a value of the load capacitor.

13. An integrated circuit DC-to-DC converter, comprising:

an input for receiving an input voltage;

a load capacitor coupled between an output voltage terminal and a ground potential, the output voltage terminal for supplying a regulated voltage to a load circuit:

a segmented switched capacitor matrix comprising a plurality of weighted switched capacitor circuits selectively coupled between the input and the output voltage terminal, and selectively coupled between the ground potential and the output voltage terminal, responsive to control signals for enabling each of the weighted switched capacitor circuits and responsive to a first and a second non-overlapping clock signal, the plurality of weighted switched capacitor circuits for forming a variable transfer capacitance;

control circuitry for generating the control signals to the segmented switched capacitor matrix in response to comparator signals indicating that an output voltage is below a first predetermined threshold and to signals indicating that the output voltage is above a second predetermined threshold;

a first comparator circuit for comparing a feedback voltage proportional to the output voltage to the first predetermined threshold and for outputting the comparator signals when the output voltage is below the first predetermined threshold;

a second comparator circuit for comparing the feedback voltage to the second predetermined threshold and for outputting the comparator signals when the output voltage is above the second predetermined threshold; and a clock generator circuit for outputting the first and the second non-overlapping clock signals and for receiving a fixed frequency input clock signal;

wherein the control circuitry outputs enable signals to the segmented switched capacitor matrix to modulate a value of the transfer capacitance obtained from the segmented switched capacitor matrix by incrementing a count value when the output voltage is below the first predetermined threshold and by decrementing the count value when the output voltage is above the second predetermined threshold.

14. The converter of claim 13 wherein the control circuitry modifies the enable signals to the segmented switched capacitor matrix so that the transfer capacitance is modified by multiples of a unit capacitance value in a coarse mode of operation and modifies the enable signals to the segmented switched capacitor matrix so that the transfer capacitance is modified by multiples of a fraction of the unit capacitance value in a fine mode of operation.

15. An integrated circuit DC-to-DC converter, comprising:
an input for receiving an input voltage;
a load capacitor coupled between an output voltage terminal and a ground potential, the output voltage terminal for supplying a regulated voltage to a load circuit;
a segmented switched capacitor matrix comprising a plurality of weighted switched capacitor circuits selectively coupled between the input and the output voltage terminal, and selectively coupled between the ground potential and the output voltage terminal, responsive to control signals for enabling each of the weighted switched capacitor circuits and responsive to a first and a second non-overlapping clock signal, the plurality of weighted switched capacitor circuits for forming a variable transfer capacitance;
control circuitry for generating the control signals to the segmented switched capacitor matrix in response to comparator signals indicating that an output voltage is below a first predetermined threshold and to signals indicating that the output voltage is above a second predetermined threshold;
a first comparator circuit for comparing a feedback voltage proportional to the output voltage to the first predetermined threshold and for outputting the comparator signals when the output voltage is below the first predetermined threshold;
a second comparator circuit for comparing the feedback voltage to the second predetermined threshold and for outputting the comparator signals when the output voltage is above the second predetermined threshold; and
a clock generator circuit for outputting the first and the second non-overlapping clock signals and for receiving a fixed frequency input clock signal;
wherein the segmented switched capacitor matrix further comprises:
a coarse bank of segmented weighted switched capacitor circuits having weights of eight, four, two and one times a unit capacitor value and each having an enable signal for adding the segmented switched capacitor matrix to the transfer capacitance; and
a fine bank of segmented weighted switched capacitor circuits having weights of four, two and one times a fractional unit capacitor value and each having an enable signal for enabling the four and two weights to be selectively added to the transfer capacitance.

16. The converter of claim 15 wherein the control circuitry enables the coarse bank of segmented weighted switched capacitor circuits when power is initially applied to the converter.

17. A method for providing a regulated output voltage, the method comprising:
providing a load capacitor coupled between a ground potential and an output terminal for outputting the regulated output voltage;
providing a segmented switched capacitor matrix comprising a plurality of selectively enabled switched capacitor circuits controlled by a first non-overlapping clock signal and a second non-overlapping clock signal at a switching frequency, the segmented switched capacitor matrix coupled to the output terminal to provide a variable transfer capacitance;
providing control circuitry to selectively enable one or more of the plurality of selectively enabled switched capacitor circuits, the switched capacitor circuits being coupled to an input voltage during an active portion of the first non-overlapping clock signal and being coupled between the ground potential and the regulated output voltage during an active portion of the second non-overlapping clock signal;
observing a feedback voltage indicative of the regulated output voltage;
comparing the feedback voltage to a first threshold voltage and a second threshold voltage;
operating the control circuitry to provide enable signals and to modulate a value of the transfer capacitance responsive to the comparing, to maintain the regulated output voltage between the first and the second threshold voltages;
providing an up/down counter coupled to the control circuitry and outputting the enable signals to the segmented switched capacitor matrix;
determining when the feedback voltage is below the first threshold voltage and determining when the feedback voltage is above the second threshold voltage;

incrementing a count in the up/down counter and increasing the value of the transfer capacitance to increase the regulated output voltage obtained at the output terminal responsive to the determining the feedback voltage is below the first threshold voltage;

decrementinq a count in the up/down counter and decreasing the value of the transfer capacitance to decrease the regulated output voltage obtained at the output terminal responsive to the determining the feedback voltage is above the second threshold voltage.

18. The method of claim 17, further comprising:

providing a non-overlapping clock circuit for generating the first and the second non-overlapping clock signals from a received input signal;

selectively providing a clock input and a lower frequency input to the received input signal responsive to a control signal;

determining when a load coupled to the output terminal is in a low load condition; and selecting the lower frequency input responsive to the determining the load coupled to the output terminal is in the low load condition.

19. The method of claim 17 wherein the determining is performed by detecting when the transfer capacitance provided by the segmented switched capacitor matrix is at a minimum value and the control circuitry attempts to decrement the up/down counter.

20. An integrated circuit comprising:

a semiconductor substrate;

a DC voltage output within the semiconductor substrate;

a load capacitor formed on the semiconductor substrate and coupled between the DC voltage output and a ground reference;

a segmented switched capacitor matrix comprising a plurality of switched capacitor segments of different weights formed on the semiconductor substrate and having switches clocked by a first non-overlapping clock signal and a second non-overlapping clock signal and further having enable signals to form a variable capacitance transfer capacitor coupled to the load capacitor to output a DC voltage at the DC voltage output;

load circuitry coupled to the DC voltage output for receiving current from the DC voltage output;

a DC voltage input coupled to the segmented switched capacitor matrix;

feedback circuitry for receiving a feedback voltage from the DC voltage output and comparison circuitry for comparing the feedback voltage to a first threshold voltage and to a second threshold voltage and for outputting a first signal indicating when the feedback voltage is below the first threshold voltage and for outputting a second signal indicating when the feedback voltage is above the second threshold voltage; and control circuitry for selectively enabling ones of the switched capacitor segments to act with the load capacitor as a DC-to-DC converter circuit to output the DC voltage on the DC voltage output, the control circuitry increasing the variable capacitance transfer capacitor when the feedback voltage is below the first threshold voltage and decreasing the variable capacitance transfer capacitor when the feedback voltage is above the second threshold voltage, to regulate the DC voltage output;

wherein the segmented switched capacitor matrix further comprises a first plurality of switched capacitor circuits that is weighted in multiples of a unit capacitance to form a binary scale, and a second plurality of switched capacitor circuits that is weighted in multiples of a fraction of the unit capacitance to form a variable fractional value of the unit capacitance.

21. The integrated circuit of claim 20, further comprising second control circuitry to determine when the feedback voltage is below a third threshold voltage and to increase the variable capacitance transfer capacitor by multiples of the unit capacitance by enabling segments of the first plurality of switched capacitor circuits sequentially until the feedback voltage is increased above the third threshold voltage.

* * * * *